(12) United States Patent
Nagornykh

(10) Patent No.: US 12,423,779 B1
(45) Date of Patent: Sep. 23, 2025

(54) METROLOGY SYSTEM UTILIZING POINTS-FROM-FOCUS TYPE PROCESSES WITH GLARE REDUCTION

(71) Applicant: Mitutoyo Corporation, Kanagawa-ken (JP)

(72) Inventor: Pavel Ivanovich Nagornykh, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 2 days.

(21) Appl. No.: 18/649,717

(22) Filed: Apr. 29, 2024

(51) Int. Cl.
*G01B 11/24* (2006.01)
*G06T 5/50* (2006.01)
(Continued)

(52) U.S. Cl.
CPC .............. *G06T 5/50* (2013.01); *G06T 7/0002* (2013.01); *H04N 23/67* (2023.01); *G06T 2207/10148* (2013.01); *G06T 2207/10152* (2013.01); *G06T 2207/20216* (2013.01); *G06T 2207/30168* (2013.01)

(58) Field of Classification Search
CPC ...................... G06T 5/50; G06T 7/0002; G06T 2207/10148; G06T 2207/10152; G06T 2207/20216; G06T 2207/30168; H04N 23/67
See application file for complete search history.

(56) References Cited

U.S. PATENT DOCUMENTS

| | | |
|---|---|---|
| 1,840,448 A | 1/1932 | Heine |
| 4,567,551 A | 1/1986 | Choate |
| | (Continued) | |

FOREIGN PATENT DOCUMENTS

| | | |
|---|---|---|
| EP | 2602649 A1 | 6/2013 |
| JP | 2003315678 A | 11/2003 |
| | (Continued) | |

OTHER PUBLICATIONS

Bruker alicona, "µCMM and the new software MetMaX," focus variation, English edition 9, 79 pages.
(Continued)

*Primary Examiner* — Patrick E Demosky
(74) *Attorney, Agent, or Firm* — Seed Intellectual Property Law Group LLP

(57) ABSTRACT

A metrology system is provided including a lighting configuration and camera which are controlled to acquire image stacks of a workpiece, wherein each image stack is acquired utilizing different lighting (e.g., corresponding to different lighting positions). Sets of pixel intensity values from the image stacks are utilized to determine a composite stack which includes one pixel intensity value for each pixel position and focus position. At least some of the pixel intensity values of the composite stack are determined according to a glare reduction process which determines a corresponding pixel intensity value for the composite stack that is less than a maximum pixel intensity value of the corresponding set of pixel intensity values. Focus curve data is determined based at least in part on the pixel intensity values of the composite stack, wherein the focus curve data indicates three dimensional positions of a plurality of surface points on the workpiece.

20 Claims, 16 Drawing Sheets

(51) Int. Cl.
*G06T 7/00* (2017.01)
*H04N 23/67* (2023.01)

(56) References Cited

U.S. PATENT DOCUMENTS

| | | | |
|---|---|---|---|
| 5,038,258 | A | 8/1991 | Koch et al. |
| 5,461,417 | A | 10/1995 | White et al. |
| 5,684,530 | A | 11/1997 | White |
| 5,690,417 | A | 11/1997 | Polidor et al. |
| 6,179,439 | B1 | 1/2001 | Choate |
| 6,273,338 | B1 | 8/2001 | White |
| 6,454,437 | B1 | 9/2002 | Kelly |
| 6,542,180 | B1 | 4/2003 | Wasserman et al. |
| 6,857,762 | B2 | 2/2005 | Shimokawa et al. |
| 7,030,351 | B2 | 4/2006 | Wasserman et al. |
| 7,113,684 | B1 | 9/2006 | Cianciotto et al. |
| 7,127,159 | B2 | 10/2006 | Gladniek et al. |
| 7,171,097 | B2 | 1/2007 | Cianciotto et al. |
| 7,173,775 | B2 | 2/2007 | Cianciotto et al. |
| 7,324,682 | B2 | 1/2008 | Wasserman |
| 7,454,053 | B2 | 11/2008 | Bryll et al. |
| 7,564,623 | B2 | 7/2009 | Vodyanoy et al. |
| 7,570,795 | B2 | 8/2009 | Yu et al. |
| 7,627,162 | B2 | 12/2009 | Blanford et al. |
| 7,780,364 | B2 | 8/2010 | Raskar et al. |
| 7,782,513 | B1 | 8/2010 | Gladnick |
| 8,085,295 | B2 | 12/2011 | Tobiason et al. |
| 8,111,905 | B2 | 2/2012 | Campbell |
| 8,111,938 | B2 | 2/2012 | Bryll et al. |
| 8,194,307 | B2 | 6/2012 | Arnold et al. |
| 8,581,162 | B2 | 11/2013 | Campbell |
| 8,926,152 | B2 | 1/2015 | Burges |
| 9,060,117 | B2 | 6/2015 | Bryll et al. |
| 9,143,674 | B2 | 9/2015 | Gladnick |
| 9,213,175 | B2 | 12/2015 | Arnold |
| 9,256,009 | B2 | 2/2016 | Theriault et al. |
| 9,726,876 | B2 | 8/2017 | Bryll |
| 9,736,355 | B1 | 8/2017 | Bryll |
| 9,774,765 | B2 | 9/2017 | Bryll et al. |
| 9,830,694 | B2 | 11/2017 | Bryll |
| 9,930,243 | B2 | 3/2018 | Gladnick et al. |
| 9,983,459 | B2 | 5/2018 | Arnold |
| 10,007,101 | B2 | 6/2018 | Prantl et al. |
| 10,101,572 | B2 | 10/2018 | Bryll et al. |
| 10,151,962 | B2 | 12/2018 | Gladnick et al. |
| 10,178,321 | B2 | 1/2019 | Emtman et al. |
| 10,520,650 | B2 | 12/2019 | Freerksen et al. |
| 10,578,827 | B2 | 3/2020 | Cook |
| 10,785,418 | B2 | 9/2020 | Kotfis et al. |
| 10,809,378 | B1 | 10/2020 | Gladnick et al. |
| 10,880,468 | B1 | 12/2020 | Bryll |
| 11,119,214 | B2 | 9/2021 | Tobiason et al. |
| 11,125,967 | B2 | 9/2021 | Gladnick |
| 2003/0156409 | A1 | 8/2003 | Choate et al. |
| 2003/0169431 | A1 | 9/2003 | Moriuchi et al. |
| 2005/0135766 | A1 | 6/2005 | Cianciotto et al. |
| 2006/0211802 | A1 | 9/2006 | Asgari |
| 2007/0046898 | A1* | 3/2007 | Conner ............... H04N 9/3155 353/31 |
| 2007/0242924 | A1 | 10/2007 | Cianciotto et al. |
| 2007/0263298 | A1 | 11/2007 | El-Ghoroury et al. |
| 2008/0123196 | A1 | 5/2008 | Cianciotto |
| 2008/0285254 | A1 | 11/2008 | Shimokawa et al. |
| 2009/0273843 | A1 | 11/2009 | Raskar et al. |
| 2010/0137990 | A1 | 6/2010 | Apatsidis et al. |
| 2012/0026386 | A1 | 2/2012 | Tomita |
| 2014/0368726 | A1* | 12/2014 | Gladnick ............... G01B 11/24 348/349 |
| 2016/0025903 | A1 | 1/2016 | Arnold |
| 2017/0052425 | A1 | 2/2017 | Arnold |
| 2017/0078549 | A1 | 3/2017 | Emtman et al. |
| 2018/0143419 | A1 | 5/2018 | Bryll et al. |
| 2018/0180773 | A1 | 6/2018 | Usami et al. |
| 2019/0369300 | A1 | 12/2019 | Freerksen et al. |

FOREIGN PATENT DOCUMENTS

| | | |
|---|---|---|
| JP | 2005158490 A | 6/2005 |
| JP | 5906849 B2 | 4/2016 |
| WO | WO 9922224 A1 | 5/1999 |

OTHER PUBLICATIONS

Dross et al., "Illumination Optics: Köhler integration optics improve illumination homogeneity," URL: https://www.laserfocusworld.com/optics/article/16551351/illumination-optics-khler-integration-optics-improve-illumination-homogeneity. (8 pages).

Edmund Optics Worldwide, "Imaging Resource Guide, Section 11.4, Telecentric Illumination." (7 pages).

KEYENCE, "3D Laser Scanning Confocal Microscope; VK-X250/X150/X120," 2014, 40 pages.

KEYENCE, "3D Surface Profiler; VK-X3000 Series," User's Manual, 2021, 92 pages.

KEYENCE, "Digital Microscope; VHX-7000," User's Manual, 2020, 300 pages.

Mermillod-Blondin et al., "High speed varifocal imaging with a tunable acoustic gradient index of refraction lens," *Optics Letters* 33(18):2146-2148, Sep. 15, 2008, (3 pages).

Mitutoyo Corporation & Micro Encoder Inc. "QVPAK® 3D CNC Vision Measuring Machine User's Guide," Version 7, Jan. 2003, 329 pages.

Wikipedia, "Telecentric lens," URL: https://en.wikipedia.org/w/index.php?title=Telecentric_lens&oldid=1063609064. (4 pages).

Wueller Dietmar, "Image Flare measurement according to ISO 18844," Image Engineering, Frechen, Germany, 7 pages.

\* cited by examiner

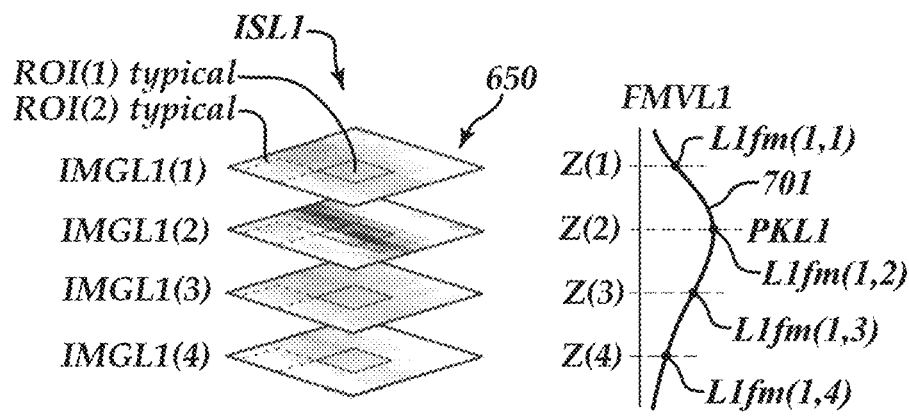
Fig. 7B  Fig. 7A ROI(1) Focus Curve
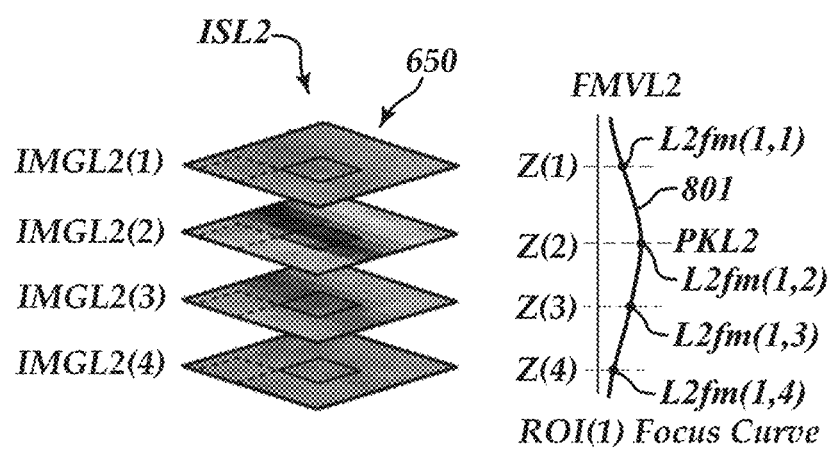
Fig. 8B  Fig. 8A ROI(1) Focus Curve

METROLOGY SYSTEM UTILIZING POINTS-FROM-FOCUS TYPE PROCESSES WITH GLARE REDUCTION

BACKGROUND

Technical Field

This disclosure relates to precision metrology, and more particularly to metrology systems capable of providing light from different lighting positions towards a workpiece and for which images may be acquired at different focus positions.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC based vision systems and QVPAK® software available from Mitutoyo America Corporation (MAC), located in Aurora, Illinois. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope type optical system and moves the stage to provide inspection images of workpieces.

Accuracies in the micron or sub-micron range are often desired in such systems. This is particularly challenging with regard to Z-height measurements/positions (e.g., such as may be utilized for reconstructing a 3-dimensional shape of a surface of a workpiece). Z-height measurements/positions (along the optical axis of the camera system) are derived in some implementations from a "best focus" position (e.g., as part of a points-from-focus type process). Determining a best focus position is a relatively complex process that generally depends on combining and/or comparing information derived from multiple images. Thus, the level of precision and reliability achieved for Z-height measurements is often less than that achieved for the X and Y measurement axes, where measurements are typically based on feature relationships within a single image. In some instances, such processes may be complicated by certain types of lighting issues. A system that can provide improvements with regard to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system is provided that includes an objective lens, a camera, a lighting configuration, one or more processors, and a memory. The objective lens has an optical axis and is configured to input image light arising from a workpiece and to transmit the image light along an imaging optical path. The camera has a sensor array including pixels, and the camera is configured to receive image light transmitted along the imaging optical path and to provide images of the workpiece. A focus position that corresponds to the focus of the images is configured to be variable along the optical axis. The lighting configuration is configured to provide light from a plurality of different lighting positions toward the workpiece. The plurality of lighting positions include at least first and second lighting positions. The one or more processors are coupled to the memory. The memory stores program instructions that when executed by the one or more processors cause the one or more processors to at least control the lighting configuration and the camera to acquire a plurality of image stacks. The plurality of image stacks include at least first and second image stacks, wherein, each image stack is acquired utilizing different corresponding workpiece lighting. The first image stack is acquired utilizing first workpiece lighting which comprises light from the first lighting position, and the second image stack is acquired utilizing second workpiece lighting which comprises light from the second lighting position. Each image stack includes a plurality of images of the workpiece for which each image corresponds to a different focus position along the optical axis, and each image has associated pixel intensity values for which each pixel intensity value corresponds to a pixel position and the focus position of the respective image and for which the plurality of image stacks comprises a set of pixel intensity values for each pixel position and focus position EFP with one pixel intensity value of the set coming from each image stack. The sets of pixel intensity values are utilized to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values. Focus curve data is determined based at least in part on the pixel intensity values of the composite stack, wherein the focus curve data indicates three dimensional positions of a plurality of surface points on the workpiece.

In another aspect, a method for operating the metrology system is provided. The method includes acquiring a plurality of image stacks, the plurality of image stacks including at least first and second image stacks, wherein each image stack is acquired utilizing different corresponding workpiece lighting. The first image stack is acquired utilizing first workpiece lighting which comprises light from the first lighting position, and the second image stack is acquired utilizing second workpiece lighting which comprises light from the second lighting position. Each image stack includes a plurality of images of the workpiece for which each image corresponds to a different focus position along the optical axis. Each image has associated pixel intensity values for which each pixel intensity value corresponds to a pixel position and the focus position of the respective image and for which the plurality of image stacks comprises a set of pixel intensity values for each pixel position and focus position with one pixel intensity value of the set coming from each image stack. The sets of pixel intensity values are utilized to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values. Focus curve data is determined based at least in part on the pixel intensity values of the composite stack, wherein the focus curve data indicates three dimensional positions of a plurality of surface points on the workpiece.

In another aspect, a method for determining focus curve data which indicates three dimensional positions of a plurality of surface points on a workpiece is provided. The method includes utilizing a lighting configuration and a camera to acquire a plurality of image stacks. The plurality of image stacks include at least first and second image stacks. Each image stack is acquired utilizing different corresponding workpiece lighting. The first image stack is acquired utilizing first workpiece lighting which comprises light from a first lighting position and the second image stack is acquired utilizing second workpiece lighting which comprises light from a second lighting position. Each image stack includes a plurality of images of the workpiece for which each image corresponds to a different focus position along the optical axis. Each image has associated pixel intensity values for which each pixel intensity value corresponds to a pixel position and the focus position of the respective image and for which the plurality of image stacks comprises a set of pixel intensity values for each pixel position and focus position with one pixel intensity value of the set coming from each image stack. The sets of pixel intensity values are utilized to determine a composite stack which includes one pixel intensity value for each corresponding pixel position and focus position. At least some of the pixel intensity values of the composite stack are determined according to a glare reduction process which is configured to determine a corresponding pixel intensity value for the composite stack that is less than a maximum pixel intensity value of the corresponding set of pixel intensity values. Focus curve data is determined based at least in part on the pixel intensity values of the composite stack, wherein the focus curve data indicates three dimensional positions of a plurality of surface points on the workpiece.

BRIEF DESCRIPTION OF THE SEVERAL VIEWS OF THE DRAWINGS

FIGS. 7A and 7B are diagrams illustrating a first image stack acquired utilizing first workpiece lighting which comprises light from a first lighting position and a corresponding first contrast focus curve.

FIGS. 8A and 8B are diagrams illustrating a second image stack acquired utilizing second workpiece lighting which comprises light from a second lighting position and a corresponding second contrast focus curve.

DETAILED DESCRIPTION

Figure 1:
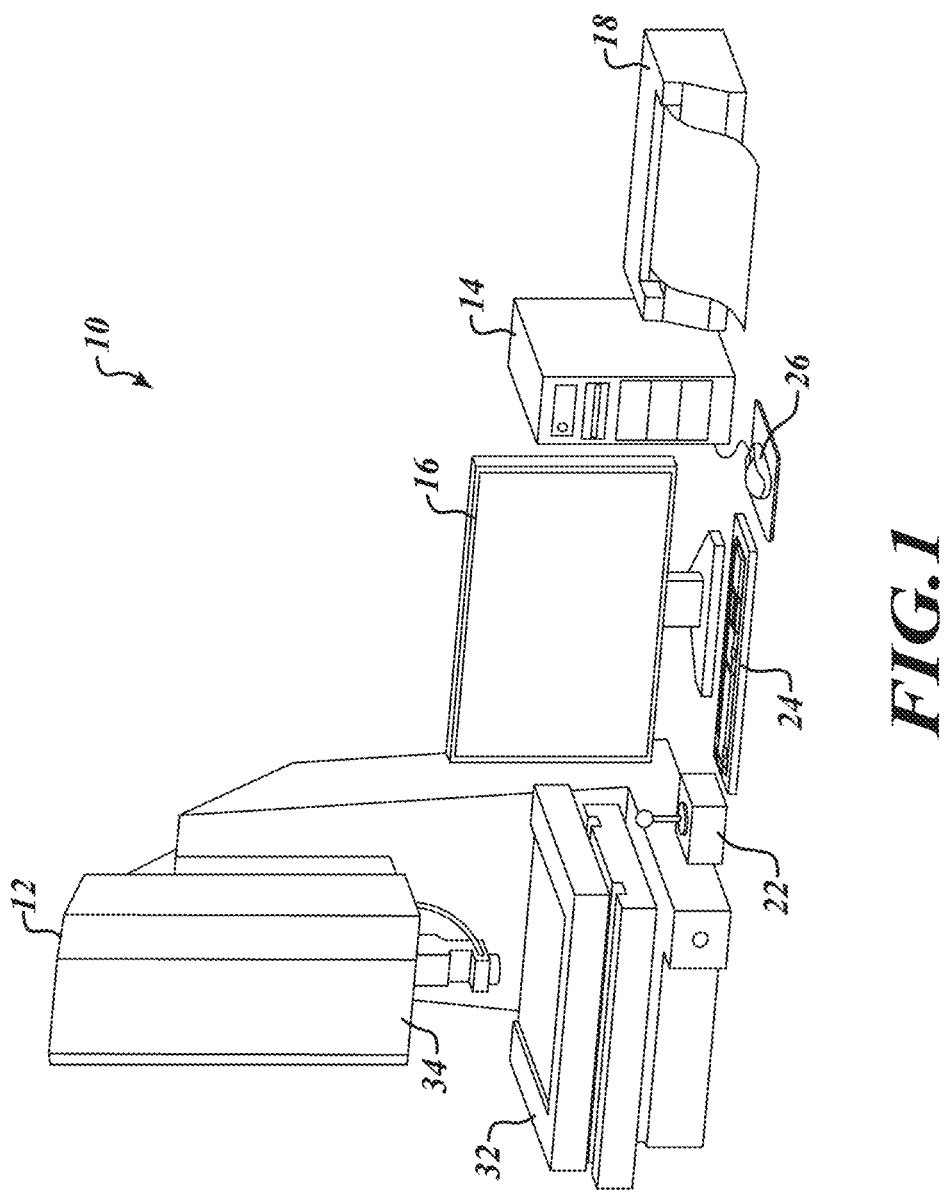
FIG. 1 is a diagram showing various typical components of a general-purpose precision machine vision metrology system.

FIG. 1 is a diagram showing various typical components of a general-purpose precision machine vision metrology system 10. The machine vision metrology system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision metrology system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of a machine vision metrology system 10 are also described in commonly assigned U.S. Pat. Nos. 7,454,053; 7,324,682; 8,111,905; and 8,111,938, each of which is hereby incorporated herein by reference in its entirety. As will be described in more detail below, for various applications it may be desirable to provide light from different lighting positions towards a workpiece (e.g., which is located on the workpiece stage 32). As will be described in more detail below with respect to FIGS. 2 and 3, a lighting configuration (e.g., lighting configuration 230, 330, etc.) may be utilized in a system such as that of FIG. 1 and may include lighting portions which provide such light from multiple positions.

Figure 2:
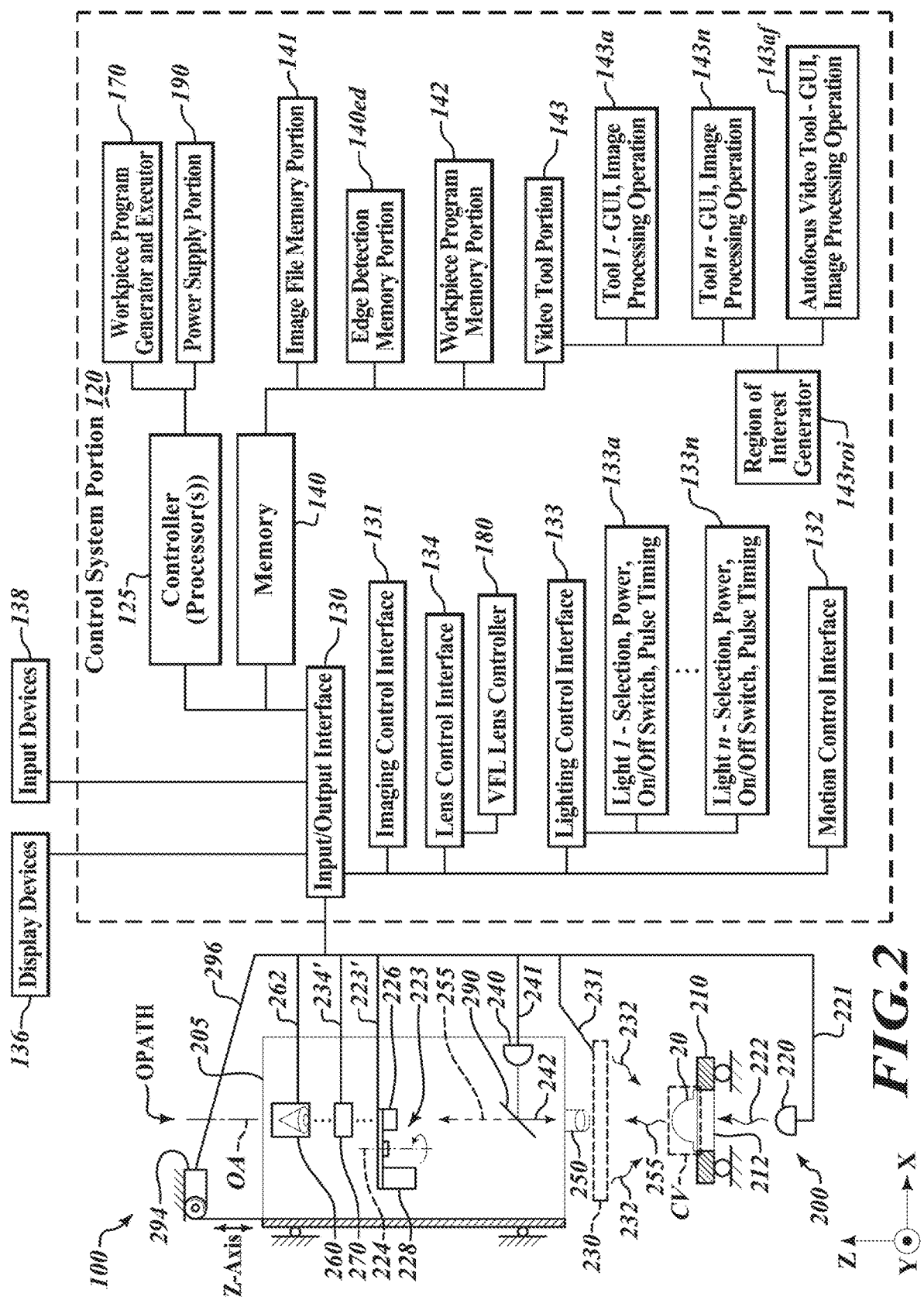
FIG. 2 is a block diagram of a control system portion and a vision components portion of a machine vision metrology system similar to that of FIG. 1.

FIG. 2 is a block diagram of a control system portion 120 and a vision components portion 200 of a machine vision metrology system 100 similar to the machine vision metrology system of FIG. 1. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. In various implementations, the workpiece stage 210 (e.g., which may be similar or identical to the stage 32 of FIG. 1) is controllably movable (e.g., utilizing a motor) along at least one or both of the X and Y axes that lie in a plane that is generally parallel to the surface of the stage where a workpiece 20 may be positioned.

The optical assembly portion 205 includes a camera system 260 (i.e., including a camera), an interchangeable objective lens 250 and a variable focal length (VFL) lens 270. In various implementations, the VFL lens 270 may be a tunable acoustic gradient ("TAG" or "TAGLENS") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of its optical system. The TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG (aka TAGLENS) lenses and related controllable signal generators are available, for example, from Mitutoyo Corporation of Kanagawa, Japan. As a specific example, certain TAG lenses are capable of periodic modulation having a modulation frequency of up to 1.0 MHz. Various aspects of operating principles and applications of TAG lenses are described in greater detail in U.S. Pat. Nos. 10,178,321; 10,101,572; 9,930,243; 9,736,355; 9,726,876; 9,143,674; 8,194,307; and 7,627,162, each of which is hereby incorporated herein by reference in its entirety.

In various implementations, the optical assembly portion 205 may further include a turret lens assembly 223 having lenses 226 and 228. The control system portion 120 may control the turret lens assembly 223 to rotate along axis 224 to select a turret lens through a signal line or bus 223' to alter an image magnification. As an alternative to the turret lens assembly, in various implementations, a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z axis that is generally orthogonal to the X and Y axes by using a controllable motor 294 that drives an actuator to move the optical assembly portion 205 along the Z axis to change the focus of the image of a workpiece 20. The controllable motor 294 is connected to an input/output interface 130 via a signal line 296. As will be described in more detail below, to change the focus of the image over a smaller range, or as an alternative to moving the optical assembly portion 205, the VFL (TAG) lens 270 may be controlled via a signal line 234' by a lens control interface 134 to periodically modulate the optical power of the VFL lens 270 and thus modulate an effective focus position of the optical assembly portion 205. The lens control interface 134 may include a VFL lens controller 180 according to various principles disclosed herein, as described in greater detail below. A workpiece 20 may be placed on the workpiece stage 210. The workpiece stage 210 may be controlled to move relative to the optical assembly portion 205 (e.g., one or both of the X and Y axes) and/or the optical assembly portion 205 may be controlled to move relative to the workpiece stage (e.g., along one or both of the X and Y axes), such that the field of view of the interchangeable objective lens 250 moves between locations on a workpiece 20, and/or among a plurality of workpieces 20, etc.

One or more of a stage light source 220, a lighting configuration 230, and a coaxial light source 240 may emit source light 222, 232, and/or 242, respectively, to illuminate a workpiece 20 or workpieces 20. Various light sources (e.g., the light sources 220, 230, 240) may be connected to the lighting control interface 133 of the control system portion 120 through associated signal lines (e.g., busses 221, 231, 241, respectively).

The lighting configuration 230 may be configured and/or operated in accordance with certain principles as will be described in more detail below. In various exemplary embodiments, pulsed (e.g., strobed) illumination, or continuous illumination, may be used. In various implementations, during an image exposure, the lighting configuration 230 may emit source light 232 toward a central volume CV in which at least part of the workpiece 20 is located. In another example, during an image exposure, the coaxial light source 240 may emit source light 242 along a path including a beam splitter 290 (e.g., a partial mirror/reflective surface). The source light 232, 242 is reflected as image light 255, and the image light used for imaging passes through the interchangeable objective lens 250, the turret lens assembly 223 and the VFL (TAG) lens 270, and is gathered by the camera system 260. A workpiece image exposure, which includes the image of the workpiece(s) 20, is captured by the camera system 260, and is output on a signal line 262 to the control system portion 120.

As will be described in more detail below with respect to FIGS. 9A and 9B, in various implementations the lighting configuration 230 includes a plurality of lighting portions configured to illuminate the workpiece 20 for producing image light 255, wherein each lighting portion is configured to direct light toward a central volume CV (e.g., in which at least part of the workpiece 20 may be positioned). As noted above, the objective lens 250 is configured to input image light 255 arising from the workpiece 20, wherein the objective lens 250 is configured to transmit the image light along an imaging optical path OPATH, and has an optical axis OA. In the example of FIG. 2, the objective lens 250 transmits the image light along the imaging optical path OPATH that passes through the VFL lens 270 to the camera 260. The camera 260 is configured to receive the image light transmitted along the imaging optical path OPATH and to provide images of the workpiece 20. As will be described in more detail below with respect to FIG. 3, in various implementations a focus position EFP that corresponds to the focus of the images is configured to be variable within a focus range Refp along the optical axis. In various implementations, the lighting configuration 230 is controlled through a lighting control interface 133 (e.g., including a light controller portion for controlling the lighting configuration 230, such as light controller portion 133n).

As shown in FIG. 2, in various exemplary implementations, the control system portion 120 includes a controller 125 (e.g., comprising or operating as part of one or more processors), the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable.

Figure 3:
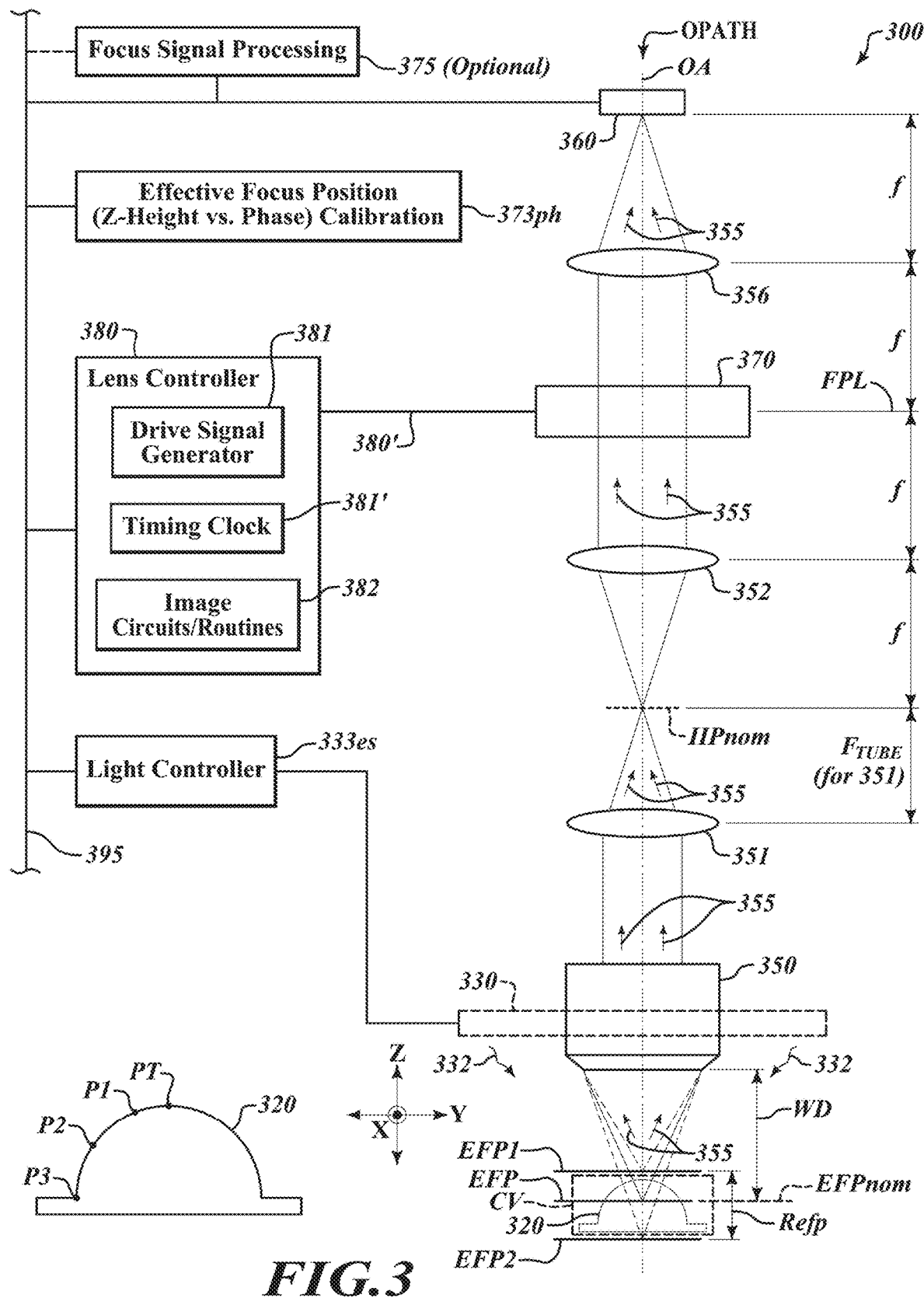
FIG. 3 is a schematic diagram of an imaging system that may be adapted to a precision non-contact metrology system such as a machine vision metrology system.

The lighting control interface 133 may include lighting control elements 133a-133n that control, for example, the selection, power, on/off switch, and pulse/strobe timing, if applicable, for the various corresponding light sources of the machine vision metrology system 100. In various implementations, an instance of strobed illumination may be regarded as a type of pulsed illumination, as the terms are utilized herein. In some implementations, a light controller 333es as shown in FIG. 3 may provide pulse/strobe timing signals to one or more of the lighting control elements 133a-133n, such that they provide an image exposure pulse/strobe timing that is synchronized with a desired phase time of the VFL lens focus position modulation (e.g., in accordance with certain stored calibration data), and as described in greater detail below. In some implementations, the light controller 333es of FIG. 3 and one or more of the lighting control elements 133a-133n of FIG. 2 may be merged and/or indistinguishable.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 includes an autofocus video tool 143af that determines the GUI, image-processing operation, etc., for focus height (i.e., effective focus position (Z-coordinate/Z-height)) measurement operations. In various implementations, the autofocus video tool 143af may additionally include a high-speed focus height tool that may be utilized to measure focus heights with high speed using hardware illustrated in FIG. 3, as described in more detail in U.S. Pat. No. 9,143,674 as incorporated above. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are useable to perform inspection/measurement operations, and/or to create and/or modify part programs, to view the images captured by the camera system 260, and/or to directly control the vision components portion 200.

In various exemplary implementations, when a user utilizes the machine vision metrology system 100 to create a part program for the workpiece 20, the user generates part program instructions by operating the machine vision metrology system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision metrology system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

In various implementations, the VFL lens controller 180 is configured to control the VFL lens to periodically modulate the optical power of the VFL lens 270 over a range of optical powers at an operating frequency so as to vary the focus position of the system over a plurality of positions within the focus range. Alternatively, the controllable motor 294 may be utilized to move the optical assembly portion 205 along the Z axis to change the effective focus position of the optical assembly portion 205. In either case, in various implementations, the camera 260 may be utilized to acquire an image stack comprising a plurality of images of the workpiece 20 (e.g., as described in more detail below), wherein each image of the image stack corresponds to a different focus position along the optical axis OA (e.g., as each corresponding to a different Z-height in the example of FIG. 2). Focus curve data may be determined based at least in part on an analysis of the image stack data corresponding to the images of the image stack, wherein the focus curve data indicates three dimensional (3D) positions of a plurality of surface points on the workpiece 20 (e.g., as part of a points-from-focus type process, etc.)

FIG. 3 is a diagram of an imaging system 300 that may be adapted to a precision non-contact metrology system such as the machine vision metrology system of FIGS. 1 and 2. It will be appreciated that certain numbered components 3XX of FIG. 3 may correspond to and/or provide similar operations or functions as similarly numbered components 2XX of FIG. 2, and may be similarly understood unless otherwise indicated.

As will be described in more detail below, an imaging optical path OPATH (also called a workpiece imaging optical path herein) comprises various optical components arranged along a path that conveys image light 355 from the workpiece 320 to the camera 360. The image light is generally conveyed along the direction of their optical axes OA of the optical components. In the implementation shown in FIG. 3, all of the optical axes OA are aligned. However, it will be appreciated that this implementation is intended to be exemplary only and not limiting. More generally, the imaging optical path OPATH may include mirrors and/or other optical elements, and may take any form that is operational for imaging the workpiece 320 using a camera (e.g., the camera 360) according to known principles. In the illustrated implementation, the imaging optical path OPATH includes the VFL lens 370 (which may be included in a 4f imaging configuration) and is utilized at least in part for imaging the workpiece 320 during a workpiece image exposure.

As shown in FIG. 3, the imaging system 300 includes a lighting configuration 330, a light controller 333*es*, an objective lens 350, a tube lens 351, a relay lens 352, the VFL (TAG) lens 370, a relay lens 356, a lens controller 380, a camera 360, an effective focus position (Z-height vs. phase) calibration portion 373*ph*, and a workpiece focus signal processing portion 375 (optional). In various implementations, the various components may be interconnected by direct connections or one or more data/control busses (e.g., a system signal and control bus 395) and/or application programming interfaces, etc. In various implementations, a Z-height (e.g., of a surface point on a workpiece) may correspond to and/or alternatively be referenced as a Z-coordinate, and/or a focus position, for which these terms may be utilized interchangeably in certain instances herein.

As will be described in more detail below, in various implementations, the VFL lens controller 380 may control a drive signal of the VFL lens 370 to periodically modulate optical power of the VFL lens 370 over a range of optical powers that occur at respective phase timings within the periodic modulation. The camera 360 (e.g., including an image sensor) receives light transmitted along an imaging optical path OPATH through the VFL lens 370 during an image exposure and provides a corresponding camera image. The objective lens 350 inputs image light arising from a workpiece 320 during an image exposure, and transmits the image light along the imaging optical path OPATH through the VFL lens 370 to the camera 360 during the image exposure, to provide a workpiece image in a corresponding camera image. An effective focus position EFP in front of the objective lens 350 during an image exposure corresponds to the optical power of the VFL lens 370 during that image exposure. The light controller 333*es* is configured to control an image exposure timing used for a camera image.

With respect to the example implementation shown in FIG. 3, the lighting configuration 330 is configured to emit the source light 332 (e.g., in some instances with pulsed/strobed illumination) toward a central volume CV including at least part of a workpiece 320. The objective lens 350 receives the image light 355 (e.g., workpiece light) that is focused at an effective focus position EFP proximate to the workpiece 320, and outputs the image light 355 to the tube lens 351. The tube lens 351 receives the image light 355 and outputs it to the relay lens 352. In other implementations, other light sources may illuminate the field of view in a coaxial or non-coaxial manner; for example, light sources 220 or 240 of FIG. 2.

As will be described in more detail below with respect to FIGS. 9A and 9B, the lighting configuration 330 of FIG. 3 may include a plurality of lighting portions at corresponding lighting positions configured to provide workpiece lighting to illuminate the workpiece 320 for producing the image light 355, wherein each lighting portion at a respective lighting position is configured to direct light 332 toward the central volume CV (e.g., in which at least part of the workpiece 320 may be positioned). The objective lens 350 is configured to input the image light 355 arising from the workpiece 320, and is configured to transmit the image light 355 along the imaging optical path in OPATH, wherein the objective lens 350 has an optical axis OA. The camera 360 is configured to receive the image light 355 transmitted along the imaging optical path OPATH and to provide images of the workpiece 320, wherein a focus position EFP that corresponds to the focus of the images is configured to be variable within a focus range Refp along the optical axis OA.

The lighting configuration 330 is controlled by a light controller 333es to direct the light 332 toward the central volume CV for illuminating the workpiece 320. In various implementations, the light controller 333es is configured to control the VFL lens to periodically modulate the optical power of the VFL lens 370 over a range of optical powers at an operating frequency so as to vary the focus position of the system over a plurality of positions within the focus range Refp. Alternatively, a controllable motor (e.g., the controllable motor 294 of FIG. 2) may be utilized to move an optical assembly portion (e.g., as may include components of the imaging system 300 that correspond to those of the optical assembly portion 205 of FIG. 2) along the Z axis to change the effective focus position of the optical assembly portion. In either case, in various implementations, the camera 360 is utilized to acquire an image stack comprising a plurality of images of the workpiece 320 (e.g., as described in more detail below with respect to FIGS. 4-8B), wherein each image of the image stack corresponds to a different focus position along the optical axis OA (e.g., as each corresponding to a different Z-height in the example of FIG. 3). Focus curve data may be determined based at least in part on an analysis of the images of the image stack, wherein the focus curve data indicates three dimensional positions of a plurality of surface points on the workpiece 320 (e.g., as part of a points-from-focus type process).

In the example of FIG. 3, an enlarged illustration of the workpiece 320 shown on the left (e.g., including a curved top surface, such as may correspond to a spherical piece of solder or other workpiece surface feature) includes surface points P1, P2 and P3 along the curved surface, as well as a top surface point PT. Due to the curved surface of the workpiece, each of the surface points PT, P1, P2 and P3 is illustrated as being at a different Z-height/focus position in relation to the imaging system 300. As will be described in more detail below, image stacks may be acquired comprising a plurality of images of the workpiece 320, from which focus curve data may be determined (e.g., based at least in part on an analysis of the images of the image stack), wherein the focus curve data indicates three dimensional positions of surface points (e.g., three dimensional positions of surface points PT, P1, P2, P3) on the workpiece 320. In various implementations, the determination of three dimensional positions (e.g., including three dimensional coordinates) of surface points such as surface points PT, P1, P2 and P3 may be utilized to determine a three dimensional shape (e.g., of at least part of the workpiece 320).

In various implementations, the objective lens 350 may be an interchangeable objective lens, and the tube lens 351 may be included as part of a turret lens assembly (e.g., similar to the interchangeable objective lens 250 and the turret lens assembly 223 of FIG. 2). In the implementation shown in FIG. 3, image light 355 arising from a nominal focal plane of the objective lens 350 is focused by the tube lens 351 to form an intermediate image at a nominal intermediate image plane IIPnom. When the VFL lens 370 is in a state where it provides no lensing effect (no optical power), the nominal focal plane of the objective lens 350, the nominal intermediate image plane IIPnom, and the image plane of the camera 360 form a set of conjugate planes, according to known microscope imaging principles. In various implementations, any of the other lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the VFL lens 370. The VFL lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320) provided during a workpiece image exposure. In some implementations, an image exposure (e.g., a workpiece image exposure) may be limited or controlled by a strobe timing of the lighting configuration 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance FTUBE of the tube lens 351 is illustrated as being approximately equidistant to a midpoint between the lenses 351 and 352, as is a focal distance f of the relay lens 352. In alternative implementations, the focal distance FTUBE for the tube lens 351 may be made to be different than the focal distance f of the relay lens 352 (which corresponds to one of the 4 f's of the 4f optical configuration).

In various implementations, the illustrated 4f optical configuration permits placing the VFL (TAG) lens 370 (e.g., which may be a low numerical aperture (NA) device) at the Fourier plane FPL of the objective lens 350. This configuration may maintain the telecentricity at the workpiece 320, and may minimize scale change and image distortion (e.g., including providing constant magnification for each effective focus position (Z-height) of the workpiece 320). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 380 may include a drive signal generator portion 381, a timing clock 381', and imaging circuits/routines 382. The drive signal generator portion 381 may operate (e.g., in conjunction with the timing clock 381') to provide a periodic drive signal to the high speed VFL (TAG) lens 370 via a signal line 380' (e.g., for providing and/or adjusting an amplitude driving signal, as will be described in more detail below). In various implementations, the imaging system 300 (which may also be referenced as a VFL lens system) may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 in a manner synchronized with a desired phase timing of the VFL lens 370, as well as controlling, monitoring and adjusting the driving and response of the VFL lens 370. In various implementations, the image circuits/routines 382 perform standard imaging operations for the optical system, synchronized with the phase timings of the VFL lens 370.

With respect to the general operations of the VFL lens 370, in various implementations as described above, the lens controller 380 may rapidly adjust or modulate the optical power of the VFL lens 370 periodically, to achieve a high-speed VFL lens that periodically modulates its optical power at a TAG lens resonant frequency of 400 kHz, 250 kHz, 70 kHz, or 30 kHz, etc. As shown in FIG. 3, by using the periodic modulation of a signal to drive the VFL lens 370, the effective focus position EFP of the imaging system 300 (that is, the focus position in front of the objective lens 350) may be rapidly moved within a range Refp (e.g., a focus range or an autofocus search range, etc.) bound by an effective focus position EFP1 (or EFPmax or peak focus distance Z1max+) corresponding to a maximum optical power of the VFL lens 370 in combination with the objective lens 350, and an effective focus position EFP2 (or EFPmin or peak focus distance Z1max−) corresponding to a maximum negative optical power of the VFL lens 370 in combination with the objective lens 350. In various implementations, the effective focus positions EFP1 and EFP2 may approximately correspond to phase timings of 90 degrees and 270 degrees. For purposes of discussion, the middle of the range Refp may be designated as EFPnom, and may approximately correspond to zero optical power of the VFL lens 370 in combination with the nominal optical power of the objective lens 350. According to this description, EFPnom may approximately correspond to the nominal focal length of the objective lens 350 in some implementations (e.g., which may correspond to a working distance WD of the objective lens 350).

In some implementations, the optional focus signal processing portion 375 may input data from the camera 360 and may provide data or signals that are utilized to determine when an imaged surface region (e.g., including one or more surface points of a workpiece 320) is at an effective focus position. For example, a group of images acquired by the camera 360 at different effective focus positions (Z-heights), such as part of an image stack, may be analyzed using a known "maximum contrast" or "best focus image" analysis to determine when a region of interest of an imaged surface region (e.g., imaged surface region 650 of FIG. 6) of a workpiece 320 is at a corresponding effective focus position (Z-height). However, more generally, any other suitable known image focus detection configuration may be used. In any case, the workpiece focus signal processing portion 375 or the like may input an image or images acquired during the periodic modulation of the effective focus position (during the sweeping of multiple effective focus positions) of the VFL lens 370, and determine an image and/or image timing at which a target feature (e.g., including one or more surface points of a workpiece) is best focused.

In some implementations, the focus signal processing portion 375 may determine a phase timing corresponding to a best focus (e.g., of a workpiece feature) and output that "best focus" phase timing value to an effective focus position calibration portion 373ph. The effective focus position (Z-height vs. phase) calibration portion 373ph may store "phase" calibration data determined by calibration processes such as those disclosed in the incorporated references. The effective focus position calibration portion 373ph may provide effective focus position (Z-height vs. phase) calibration data that relates respective effective focus positions (Z-heights) to respective "best focus" phase timings within a period of a resonant frequency of the VFL lens 370. In various implementations, the associated recorded effective focus position (Z-height) calibration data 373ph may be merged with and/or indistinguishable from the lens controller 380, the workpiece focus signal processing portion 375, or a host computer system connected to the system signal and control bus 395, etc.

In various implementations, the light controller 333es controls an image exposure time of the imaging system 300 (e.g., relative to a phase timing of the periodically modulated effective focus position). More specifically, during an image exposure, the light controller 333es may use the effective focus position (Z-height) calibration data available in the effective focus position (Z-height vs. phase) calibration portion 373ph and control the lighting configuration 330 to pulse/strobe at a respective time. For example, the light controller 333es may control the lighting configuration 330 to pulse/strobe at a respective phase timing within a period of a standard imaging resonant frequency of the VFL lens 370, so as to acquire an image having a particular effective focus position within the sweeping (periodic modulation) range of the VFL lens 370. It will be appreciated that the operations of the light controller 333es and other features and elements outlined above may be implemented to govern workpiece image acquisitions.

Figure 4:
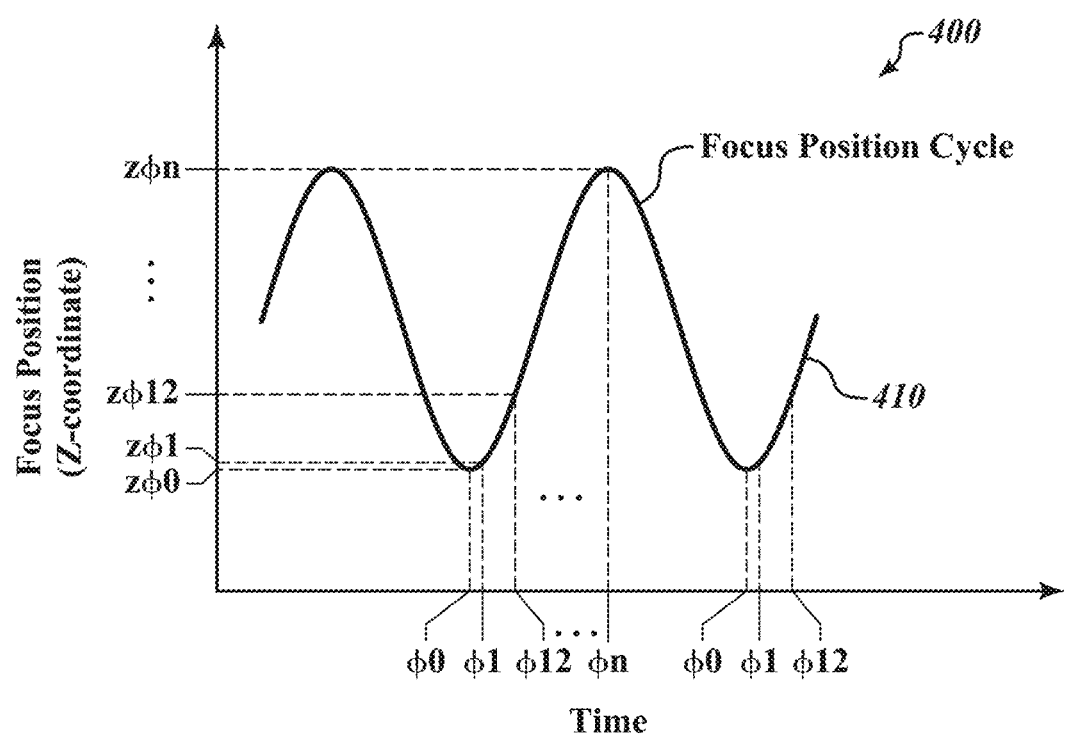
FIG. 4 is a chart of a timing diagram showing a periodically modulated focus position of a system such as that of FIGS. 1-3, and also qualitatively showing how pulsed/strobed illumination can be timed to correspond with a respective phase timing of the periodically modulated focus position to expose an image focused at a respective focus position/Z-coordinate.

FIG. 4 is a chart of a timing diagram showing a periodically modulated focus position of a system such as that of FIGS. 1-3, and also qualitatively showing how pulsed/strobed illumination can be timed to correspond with a respective phase timing of the periodically modulated focus position to expose an image focused at a respective Z-coordinate. In the illustrated example, each focus position has a corresponding Z-coordinate, for which an optical axis OA (e.g., of the objective lens 350) may define and/or otherwise be aligned (e.g., be coaxial or in parallel with, etc.) a Z-axis of a corresponding coordinate system (e.g., for which the Z-coordinates may alternatively be referenced as Z-axis coordinates and/or Z-heights). The periodically modulated focus position is represented by a sinusoidal curve 410. The relationship of the focus position (i.e., as indicated by corresponding Z-coordinates) to the phase timing may be established by calibration according to known principles (e.g., by repeatedly stepping a surface to a known Z-coordinate, and then manually or computationally determining the phase timing that best focuses an image at the known Z-coordinate, and storing that relationship in a lookup table or the like).

The diagram 400 also qualitatively shows how pulsed/strobed illumination can be timed to correspond with a respective phase timing (e.g., $\phi 0$, $\phi 1$, $\phi 12$, $\phi n$, etc.) of the periodically modulated focus position to expose an image focused at a respective Z-coordinate (e.g., $z\phi 0$, $z\phi 1$, $z\phi 12$, $z\phi n$, etc.) That is, in the illustrated example, while the camera 360 is acquiring an image during an integration period, if a pulse of illumination is short relative to the period of the focus modulation and is provided at the phase timing $\phi 0$, then the focus position will be at the Z-coordinate $z\phi 0$, and any workpiece surface/surface point that is located at the Z-coordinate $z\phi 0$ will be in focus in the resulting image. A similar description applies for the other exemplary phase timings and Z-coordinates shown in the diagram 400.

It will be understood that the phase timings shown in the diagram 400 are exemplary only and not limiting. More generally, any phase timing selected by a user or automatically selected by a control system will have an associated focus position within the range of Z-coordinates $z\phi 0$-$z\phi n$, which represent the minimum and maximum Z-coordinates of the periodically modulated focus position. It will also be understood that if one strobe pulse at a particular phase timing is not sufficient to provide a well exposed image, the strobe pulse may be repeated at that particular phase timing for any desired number of periods within the image integration period (as schematically illustrated by the repeated instances of any of the exemplary phase timings $\phi 0$, $\phi 1$, $\phi 12$ in the diagram 400). For example, one, or several, or thousands, etc., of such pulses may be integrated in an integration period, in some implementations. The effect will be to increase the image exposure corresponding to that particular phase timing and/or Z-coordinate in the resulting image. As one specific example implementation, for a variable focal length lens that modulates at a frequency of 72 kHz and an imaging array in a camera operating at 30 frames per second, a single camera frame acquisition time may correspond to 2,400 cycles of the variable focal length lens and the resulting focus position Z-coordinate. It will be appreciated that the exemplary phase timings $\phi 1$ and $\phi 12$ are shown on a rising slope of the focus position cycle. In some embodiments, pulses may also be integrated in an integration period which corresponds to the same Z-coordinates during a falling slope of the focus position cycle.

Figure 5:
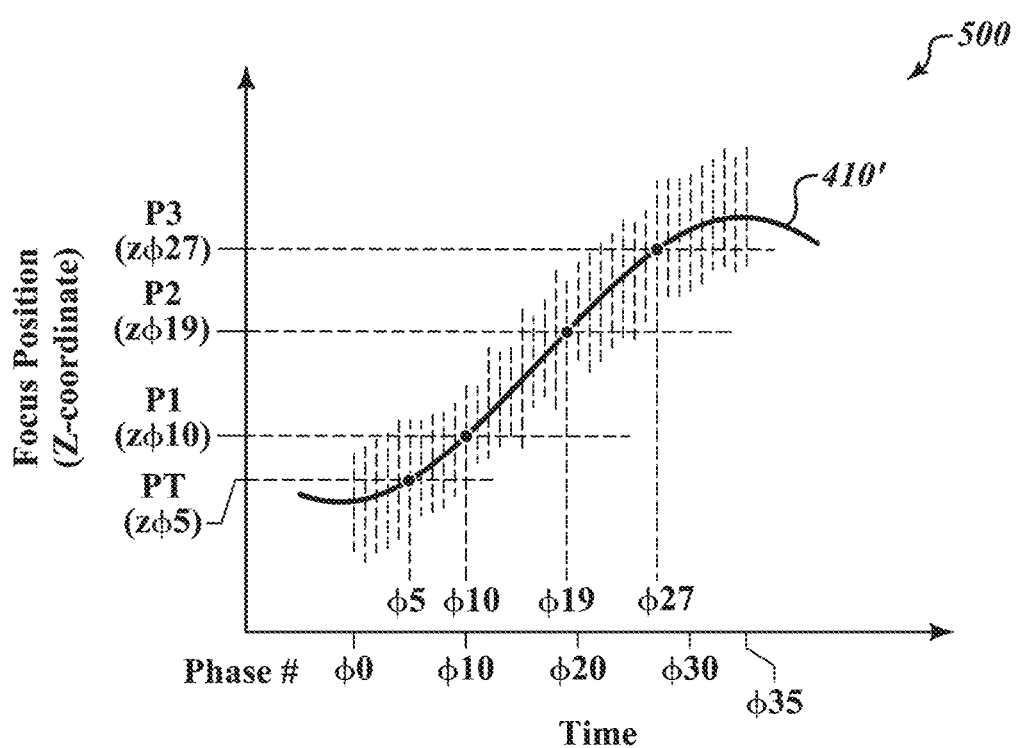
FIG. 5 is a chart showing an expanded portion of the periodically modulated focus position shown in FIG. 4, phase timings corresponding to those usable to collect an image stack, and also qualitatively showing how instances of pulsed/strobed illumination that correspond with respective phase timings of the periodically modulated focus position can be utilized to produce corresponding exposure images that provide image focus for surface points/workpiece features that are located at different focus positions/Z-coordinates.

FIG. 5 is a chart 500 showing a horizontally expanded portion 410' of the sinusoidal curve 410 of the periodically modulated focus position shown in FIG. 4, and phase timings corresponding to those usable to collect an image stack (e.g., represented by the phase timing positions of the vertical dashed lines in the chart 500). FIG. 5 also qualitatively shows how particular instances of pulsed illumination that correspond with phase timings (e.g., in this particular example exemplary phase timings $\phi 5$, $\phi 10$, $\phi 19$ and $\phi 27$) of the periodically modulated focus position can be utilized to produce corresponding exposure images that provide image focus for workpiece features/surface points that are located at different Z-coordinates (e.g., such as a top surface point PT located at a Z-coordinate $Z\phi 5$, and on the slope of the curved surface a surface point P1 located at a Z-coordinate $Z\phi 10$, a surface point P2 located at a Z-coordinate $Z\phi 19$, and a surface point P3 located at a Z-coordinate $Z\phi 27$, such as may correspond to the surface points PT, P1, P2 and P3 of the workpiece 320 of the example of FIG. 3).

Regarding the phase timings corresponding to those usable to collect an image stack (represented by the phase timing positions of the vertical dashed lines in the chart 500), in accordance with principles disclosed herein, in one implementation an image stack (or multiple image stacks) may be acquired with respect to one or more regions of interest of a representative workpiece. For example, an image stack may be acquired by exposing a first image using one or more strobe illumination pulses (e.g., over one or more periods) coinciding with the phase timing $\phi 0$. A second image in the image stack may be similarly acquired using the phase timing $\phi 1$, and so on up to phase timing $\phi 35$ in the illustrated example (e.g., such as may result in 36 images in the image stack). It will be understood that an image stack images a field of view using various focus positions, and generally can include any desired number of images of the field of view with focus positions corresponding to desired Z-coordinates (e.g., such as acquired using corresponding phase timings and/or other adjustments of the optical system).

As noted above, FIG. 5 illustrates in part how particular instances of strobed illumination that correspond with phase timings (e.g., the exemplary phase timings $\phi 5$, $\phi 10$, $\phi 19$ and $\phi 27$) of the periodically modulated focus position can be utilized to produce corresponding exposure images that provide image focus for surface points that are located at different Z-coordinates (e.g., such as a top surface point PT located at a Z-coordinate $Z\phi 5$, and on the slope of the curved surface a surface point P1 located at a Z-coordinate $Z\phi 10$, a surface point P2 located at a Z-coordinate $Z\phi 19$, and a surface point P3 located at a Z-coordinate $Z\phi 27$). As illustrated in FIG. 5, the surface points PT, P1, P2 and P3 in the field of view on a representative workpiece (e.g., workpiece 320) are indicated as having a sufficient image focus in respective images of an image stack. The surface point PT is indicated as being best or sufficiently focused at a Z-coordinate $Z\phi 5$ which corresponds to a phase timing of $\phi 5$, the surface point P1 is indicated as being best or sufficiently focused at a Z-coordinate $Z\phi 10$ which corresponds to a phase timing of $\phi 10$, and the surface point P2 is indicated as being best or sufficiently focused at a Z-coordinate $Z\phi 19$ which corresponds to a phase timing of $\phi 19$, and the surface point P3 is indicated as being best or sufficiently focused at a Z-coordinate $Z\phi 27$ which corresponds to a phase timing of $\phi 27$. In various implementations, the contrast in one or more regions of interest may be analyzed (e.g., according to known methods) in each image of an image stack. Utilizing such processes, the particular images and/or interpolated Z-coordinates indicated as providing the best or sufficient contrast and focus for the surface points PT, P1, P2 and P3, respectively, may be determined.

As noted above, in certain alternative implementations, an image stack similar to that indicated by FIG. 5 may be captured without utilizing the VFL lens 270/370. For example, a controllable motor (e.g., the controllable motor 294 of FIG. 2) or other mechanism may instead be utilized to move an optical assembly portion (e.g., optical assembly portion 205 of FIG. 2 or corresponding components of FIG. 3) or a stage (e.g., stage 210) along the Z axis to change the effective focus position of the optical assembly portion. In such implementations, the camera 360 is utilized to acquire an image stack comprising a plurality of images of the workpiece 20/320, wherein each image of the image stack corresponds to a different focus position along the optical axis OA (e.g., as each corresponding to a different Z-height), such as that indicated by the data of FIG. 5. In some implementations, the movement may be incremental to each imaging position, or may be continuous along the Z axis while the images are acquired (e.g., utilizing pulsed illumination or a relatively fast shutter speed of the camera for capturing each image so as to avoid image blur, etc.). In some instances, the velocity of the movement along the Z axis may be relatively constant and/or the movement may otherwise be performed, such that the shape of the curve similar to that of FIG. 5 may be relatively more linear rather than sinusoidal. With respect to the collections of the multiple image stacks, in various implementations a first image stack may be acquired while the system moves the focus position in a first direction (e.g., scanning down), and a second image stack may be acquired while the system moves the focus position in a second direction (e.g., scanning up), and a third image stack may be acquired while the system moves the focus position in the first direction (e.g., scanning down), and so on.

Regardless of the manner in which the image stack(s) are captured, in various implementations, a determination of an image which has the best or sufficient image focus for a workpiece feature in a region of interest may be made according to various techniques. In one specific example implementation, a technique including an analysis of a focus curve may be utilized. A focus curve may be formed based on focus curve data points, which may be established according to known methods (e.g., as described in incorporated references). Briefly, in one exemplary method, for each captured image in the image stack, a focus metric value is calculated based on the respective region of interest in that image, and that focus metric value becomes a data point on the focus curve (e.g., related to the corresponding phase timing and Z-coordinate at which the image was captured). This results in focus curve data, which may be referred to simply as a "focus curve" or "autofocus curve." Exemplary techniques for the determination and analysis of image stacks and focus curves are taught in U.S. Pat. Nos. 8,581,162; 9,060,117 and 10,880,468, each of which is hereby incorporated herein by reference in its entirety.

In some implementations, the processing including the obtaining of the image stack may be referenced as a points-from-focus (PFF) type process, as utilized to determine Z-coordinates of points on the workpiece surface. The PFF image stack may be processed to determine or output a Z-coordinate map (e.g., a point cloud) that quantitatively indicates a set of three dimensional surface coordinates (e.g., corresponding to a surface shape or profile of the workpiece). In such a PFF type analysis, in some implementations each focus curve may correspond to a single point or X,Y location on the workpiece surface. That is, the peak of each focus curve may indicate the Z-coordinate of the single point along the direction of the optical axis OA of the system. In various implementations, the PFF type analysis repeats this process for multiple surface points (e.g., each with a corresponding region of interest) across the workpiece surface such that an overall profile of the workpiece surface can be determined. In general, the process may be performed for multiple surface points that are within a field of view (i.e., as captured within the images of the image stack), where for each image of the image stack, a particular ROI(i) may correspond to an X,Y location (e.g., as may correspond to a particular point) on the workpiece surface (e.g., with the point at the center of the ROI).

As indicated above, in various implementations, the analysis of an image stack includes determining focus curve data for the image stack which indicates a focus position at which a surface point is in focus (e.g., as may correspond to a local peak or other characteristic of the focus curve). For example, the focus curve data may indicate a focus position (e.g., corresponding to a Z-coordinate $Z\phi5$, which may also be referenced as ZT) at which the surface point PT is in focus, a focus position (e.g., corresponding to a Z-coordinate $Z\phi10$, which may also be referenced as Z1) at which the surface point P1 is in focus, a focus position (e.g., corresponding to a Z-coordinate $Z\phi19$, which may also be referenced as Z2) at which the surface point P2 is in focus, and a focus position (e.g., corresponding to a Z-coordinate $Z\phi27$, which may also be referenced as Z3) at which the surface point P3 is in focus.

In addition to the determinations/indications of the Z-coordinates of each of the surface points, the focus curves may each correspond to particular X and Y coordinates. For example, in one implementation the surface point PT may be in a region of interest (e.g., as centered in the region of interest) of the images of the image stack as corresponding to a field of view, for which the region of interest may be associated with X and Y coordinates which also correspondingly indicate the X and Y coordinates (e.g., XT and YT) of the surface point PT. Similarly, the surface point P1 may be in a region of interest (e.g., as centered in the region of interest) of the images of the image stack as corresponding to the field of view, for which the region of interest may be associated with X and Y coordinates which also correspondingly indicate the X and Y coordinates (e.g., X1 and Y1) of the surface point P1. Similarly, the surface point P2 may be in a region of interest (e.g., as centered in the region of interest) of the images of the image stack as corresponding to the field of view, for which the region of interest may be associated with X and Y coordinates which also correspondingly indicate the X and Y coordinates (e.g., X2 and Y2) of the surface point P2. Similarly, the surface point P3 may be in a region of interest (e.g., as centered in the region of interest) of the images of the image stack as corresponding to the field of view, for which the region of interest may be associated with X and Y coordinates which also correspondingly indicate the X and Y coordinates (e.g., X3 and Y3) of the surface point P3.

Thus, the focus curve data, as based at least in part on an analysis of the images of the image stack, indicates three dimensional positions (e.g., X, Y, Z coordinates) of a plurality of surface points on the workpiece. In the specific examples above, the focus curve data indicates three dimensional positions of the surface points PT, P1, P2 and P3 as corresponding to determined coordinates (XT, YT, ZT), (X1, Y1, Z1), (X2, Y2, Z2) and (X3, Y3, Z3), respectively. In various implementations, a measurement related to the surface points may additionally be made based on an analysis of the focus curve data. For example, a distance between the surface points PT and P3, or P1 and P2 (e.g., as corresponding to a chord of a respective arc portion), or the Z coordinates of the surface points PT and P3 (e.g., indicating the height of the curved/spherical portion of the workpiece) may be determined based on an analysis of the focus curve data (e.g., in relation to the determined three-dimensional coordinates and known techniques for determining distances between such three-dimensional coordinates). In various implementations, such measurements may be performed as part of workpiece inspections (e.g., for ensuring that workpiece features that are produced by a manufacturing process are within expected/acceptable tolerances, etc.)

Figure 6B:
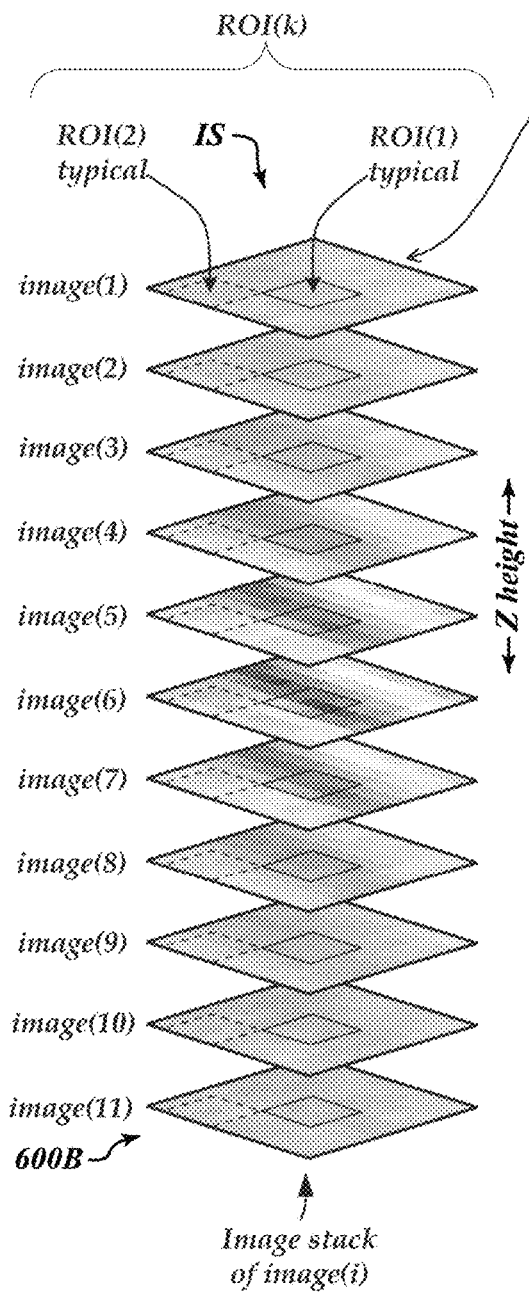
FIGS. 6A and 6B are diagrams illustrating a general image stack and corresponding contrast focus curves as may result from characteristics of lighting in corresponding regions of interest.
Figure 6A:
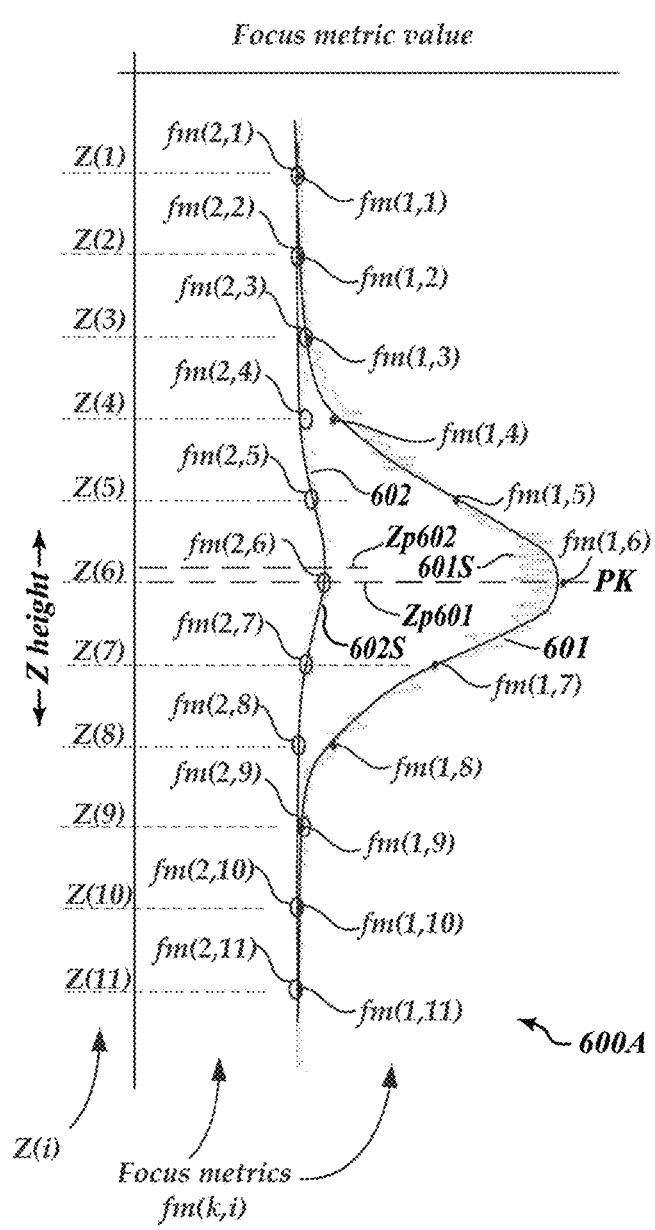

FIGS. 6A and 6B are diagrams illustrating a general image stack IS and corresponding contrast focus curves 601 and 602 as may result at least in part from characteristics of lighting in corresponding regions of interest. In various implementations (e.g., as part of a points-from-focus type process), a camera 260/360 is utilized to acquire an image stack comprising a plurality of images of the workpiece surface with the lighting, wherein each image of the image stack corresponds to a different Z-height. Focus curve data (e.g., for which the visible level of contrast may depend at least in part on the lighting) is determined based at least in part on an analysis of the images of the image stack, wherein the focus curve data indicates three dimensional positions (e.g., including Z-heights as well as relative x-axis and y-axis positions) of a plurality of surface points on the workpiece surface.

As illustrated in FIGS. 6A and 6B, contrast focus curves 601 and 602 may result at least in part from characteristics of lighting in corresponding regions of interest on a workpiece. It is generally desirable for lighting to result in sufficient contrast in images so that the peak of a contrast curve can be accurately localized and reliably distinguished from noise for all desired regions of interest. Focus curve data may be determined from analysis of an image stack (e.g., as part of points-from-focus (PFF) processes/measurement operations), which indicates 3-dimensional positions of surface points on the surface of the workpiece.

FIGS. 6A and 6B illustrate how an image stack obtained by the system (e.g., with lighting provided by a lighting configuration 330) may be utilized to determine the Z-heights of points on a workpiece surface. In various implementations, the image stack is obtained by the system to determine three dimensional profile data (e.g., including Z-heights of points on the workpiece surface, etc.). The PFF image stack may be processed to determine or output a Z-height coordinate map (e.g., a point cloud) that quantitatively indicates a set of three dimensional surface coordinates (e.g., corresponding to a surface shape or profile of the workpiece).

In the PFF analysis, each of the focus curves 601 and 602 (as shown in FIG. 6A) corresponds to a single point on the workpiece surface. That is, the peak of each focus curve indicates the Z-height of the single point along the direction of the optical axis OA (e.g., of the vision components portion of FIGS. 2 and/or 3). In various implementations, the PFF type analysis repeats this process for multiple surface points (e.g., each with a corresponding region of interest) across the workpiece surface such that an overall profile of the workpiece surface can be determined. In general, the process may be performed for the multiple surface points that are within a field of view (i.e., as captured within the images of the image stack), where for each image of the image stack, a particular ROI(i) corresponds to a particular point on the workpiece surface (e.g., with the point at the center of the ROI).

FIGS. 6A and 6B are aligned relative to one another along the Z-height axis shown in the figures. FIG. 6A is a representative graph 600A illustrating two examples of fit focus curves 601 and 602, and FIG. 6B is a diagram of a variable focus image stack 600B which includes two different regions of interest ROI(k), in particular ROI(1) and ROI(2), that correspond to the data points fm(1,i) and fm(2,i) corresponding to the two different focus curves 601 and 602, respectively, of FIG. 6A. The regions of interest ROI(k) are included in an imaged surface region 650 of a workpiece (e.g., as captured within a field of view).

Regarding the term "region of interest", it will be appreciated that some "single point" focus processes/tools (e.g., in some instances referenced as autofocus processes/tools) return a single Z-height corresponding to an entire region of interest. However, known "multi-point" type focus processes/tools may return multiple Z-heights corresponding to individual "sub-regions of interest" (e.g., a grid of sub-regions of interest) within a global region of interest defined by the multi-point type focus process/tool. For example, such sub-regions of interest may be manually and/or automatically defined as centered on each (or most) pixels within the global region of interest. Thus, in some cases, ROI(1) and ROI(2) may be regarded as representative sub-regions of interest within a global region of interest. However, the essential point is that a Z-height may be established for any defined focus region of interest (e.g., whether it is a region of interest of a single point focus process/tool, or a sub-region of interest within a global region of interest defined by a multi-point focus process/tool). Thus, it will be understood that when the term region of interest is used in relation to establishing a Z-height, that sub-regions of interest (e.g., within a global region of interest defined by a multi-point focus process/tool) may be encompassed within the meaning of that term. For simplicity of the current illustrations, the regions of interest ROI(1) and ROI(2) are shown to be relatively small (e.g., 3×3 pixels), although it will be appreciated that larger regions of interest (e.g., 7×7 pixels, etc.) may be utilized in various implementations as part of such processes, etc.

As shown in FIG. 6B, each of the images image(1)-image(11) of the image stack image(i) include the centrally located region of interest ROI(1) for which the determined focus metric values correspond to the focus metric data points fm(1,i) on the focus curve 601. The region of interest ROI(1) is schematically indicated in FIG. 6B as including a relatively high level of contrast (e.g., in image(6)), corresponding to the relatively greater focus metric values shown on the focus curve 601. Similarly, each of the images image(1)-image(11) of the image stack image(i) include the peripherally located region of interest ROI(2) for which the determined focus metric values correspond to the focus metric data points fm(2,i) on the focus curve 602. The region of interest ROI(2) is schematically indicated in FIG. 6B as including a relatively low level of contrast (e.g., in image (6)), corresponding to the relatively lesser focus metric values shown on the focus curve 602. In some instances, this may correspond to the region of interest ROI(2) being in or near a relative "shadow region" of the images, or otherwise in a region where little contrast is produced, such as in accordance with the workpiece lighting that is provided for acquiring the image stack (e.g., and for which the region of interest ROI(1) may be in a better illuminated region, or otherwise in a region where better contrast is produced, such as in accordance with the workpiece lighting that is provided for acquiring the image stack).

As shown in FIG. 6A, each focus metric value fm(1,i) or fm(2,i) may be regarded as sampling continuous underlying focus data 601S or 602S, respectively. It may be seen in FIG. 6A that the underlying focus data 601S or 602S may be relatively noisy (e.g., due to the small size of the corresponding regions of interest). However, in the case of the focus curve 601, due to higher contrast in the corresponding region of interest the focus metric values in the vicinity of the focus curve peak (e.g., focus curve peak PK near Zp601) are relatively large compared to the size of the "noise component" in the underlying focus data. In comparison, in the case of the focus curve 602, due to relatively lower contrast in the corresponding region of interest the focus metric values in the vicinity of the focus curve peak (e.g., near Zp602) are closer to the size of the "noise component" in the underlying focus data.

In one specific example, the higher focus metric values indicated in the focus curve 601 may be due at least in part to lighting that is provided by the lighting configuration on the surface area in the region of interest ROI(1) resulting in high contrast in focused images. In comparison, the lower focus metric values indicated in the focus curve 602 may be due at least in part to lighting that is provided by the lighting configuration on the surface area in the region of interest ROI(2) resulting in relatively less contrast in focused images. In any case, it will be appreciated that because of the low "signal to noise" associated with the lower peak of the focus curve 602, as compared to relatively high signal to noise associated with the peak of the focus curve 601, that the estimated Z-height of the focus peak Zp602 of the focus curve 602 may be less reliable or more uncertain than the estimated Z-height of the focus peak Zp601 of the focus curve 601 (e.g., in some instances the data of the focus curve 602 may be considered so unreliable and/or uncertain that no focus peak determination may reliably be made, as may be regarded as corresponding to a "gap" in the focus curve data for the workpiece surface).

Briefly summarizing in relation to FIGS. 6A and 6B, for points-from-focus type operations, a camera 260/360 (along with associated components) and/or stage 210 may move (e.g., as moved by a motor 294), or a VFL lens 270/370 may be utilized, to vary a focus position of the system through a range of Z-height positions Z(i) along a z-axis (e.g., the focusing axis or optical axis OA) and the camera 260/360 may be utilized to capture an image(i) at each of a plurality of corresponding focus positions. For each captured image (i), a focus metric value fm(k,i) may be calculated based on a region or sub-region of interest ROI(k) (e.g., a set of pixels) in the image and related to the corresponding focus position Z(i) (e.g., of the system as including the camera) along the Z axis at the time that the image was captured. This results in focus curve data (e.g., the focus metric values fm(k,i) at the positions Z(i), which is one type of focus peak determining data set), which may be referred to simply as a "focus curve" or "autofocus curve". In one embodiment, the focus metric values (e.g., as part of focus curve data) may involve a calculation of the contrast or sharpness of the region of interest in the image. In various embodiments, the focus values or curves may be normalized. Various focus metric calculation techniques are described in detail in the incorporated references, and various suitable focus metric functions will also be known to one of ordinary skill in the art.

The Z-height (e.g., Zp601 or Zp602) corresponding to the peak of the focus curve, which corresponds to the best focus position along the Z axis, is the Z-height for the region of interest used to determine the focus curve. The Z-height corresponding to the peak of the focus curve may be found by fitting a curve (e.g., the curve 601 or 602) to the focus curve data (e.g., the data fm(1,$i$) or fm(2,$i$)) and estimating the location of the peak of the fitted curve. It will be appreciated that while the image stack IS (e.g., the image stack for image(i)) is shown for purposes of illustration as only including 11 images, in various implementations (e.g., in an actual embodiment as part of a PFF process or otherwise) a larger number of images (e.g., 100 or 200 or more images) may be utilized. Exemplary techniques for the determination and analysis of image stacks and focus curves are taught in U.S. Pat. Nos. 6,542,180 and 8,581,162, each of which is hereby incorporated herein by reference in its entirety.

In various implementations, the contrast focus curves/ focus metric values may correspond to and/or be based at least in part on a measure or indication of a difference between pixel intensity values in a region of interest of an image. Conceptually, in certain implementations and for certain workpieces that are being imaged, a region of interest in an image that is significantly out of focus may tend toward appearing significantly blurred such that the pixels in the region of interest may tend toward having approximately a same pixel intensity value (e.g., a same general gray value), such that there is very little difference between the pixel intensity values in the region of interest. Conversely, when the same region of interest is sharply in focus (e.g., at a "best focus" position), the pixels in the region of interest may have much more significant differences between the pixel intensity values. In an image stack with images captured at a range of focus positions, the differences in the pixel intensity values for the region of interest may increase as the region of interest comes more into focus, and may be at a maximum or "peak" difference at a "best focus position" (e.g., as illustrated for the region of interest ROI(1) in image(6) of FIG. 6B). Such principles may be utilized to determine focus positions/Z-heights of surface points on a workpiece as part of a points-from-focus type process.

As a simplified example, for a region of interest (e.g., ROI(1)) that has an area of 3×3 pixels, a focus metric value (e.g., corresponding to a level of contrast) may be determined based at least in part on a difference between the pixel intensity value of the center pixel, and the pixel intensity values of each of the surrounding pixels. The corresponding determined focus metric value may be associated with the pixel position corresponding to the center pixel. As noted above, such calculations/determinations may be made for multiple or all of the images in an image stack, for which the determined focus metric values may be part of contrast focus curve data such as may form a contrast focus curve (e.g., such as contrast focus curve 601 in FIG. 6A).

As noted above, a determined focus position/Z-height (e.g., Zp601 or Zp602) may correspond to a peak of the focus curve, which corresponds to the "best focus" position along the Z axis, which is the Z-height for the region of interest (e.g., for the center of the region of interest) that is used to determine the focus curve. In various implementations where focus positions/Z-heights are being determined for surface points on a workpiece, the best focus position is ideally for a surface point on the workpiece. However, as described herein, such calculations/determinations may be undesirably affected in some instances by glare issues (e.g., such as corresponding to an imaged lighting portion, such as due to reflections of the lighting from the workpiece surface).

For example, due to such issues, a pixel (e.g., a center pixel of an ROI) may have a particularly high intensity value at a "best focus" position for an imaged lighting portion (e.g., when the lighting portion is "best focused" in the image, for which the corresponding pixel intensity value may correspondingly be very high, such as due to the brightness of the imaged lighting portion in the image, etc.). In accordance with the processing as noted above, this may result in a relatively high peak in the corresponding contrast focus curve (e.g., with the relatively high peak corresponding to a "best focus" position of the imaged lighting portion, as opposed to a best focus position of a surface point on the workpiece, and may be referenced in some instances as an "imaged lighting portion peak", as will be illustrated and described in more detail below with respect to FIG. 13B). This is undesirable, in that the objective in such an implementation is to determine the focus position/Z-height of the corresponding surface point on the workpiece, rather than a focus position/Z-height corresponding to a "best focus" position resulting from glare issues (e.g., as corresponding to a "best focus" position of an imaged lighting portion). As will be described in more detail below, in various implementations, a process (e.g., including a glare reduction process) as disclosed herein may be utilized to address such issues.

In relation to a glare reduction process as described herein, in various implementations, different numbers of lighting portions may be included and utilized as part of a lighting configuration for illuminating a workpiece (e.g., for acquiring image stacks, etc.). For example, as will be described in more detail below, in an implementation such as that of FIGS. 9A and 9B, eight lighting portions are utilized to provide light from eight discrete azimuthal directions, although it will be appreciated that different numbers of lighting portions may be provided in different implementations. In various implementations, it is desirable for a lighting configuration to include at least four lighting portions. As will be described in more detail below, in the example of FIG. 9B, for each of the lighting portions, the light is provided from a fixed inclination (e.g., corresponding to an angle θ) and eight corresponding discrete azimuthal directions (e.g., each corresponding to an angle φ).

FIGS. 7A and 7B are diagrams illustrating a first image stack ISL1 acquired utilizing first workpiece lighting which comprises light from a first lighting position (e.g., lighting position 331A of FIGS. 9A and 9B) of a lighting configuration and a corresponding first contrast focus curve 701. FIGS. 8A and 8B are diagrams illustrating a second image stack ISL2 acquired utilizing second workpiece lighting which comprises light from a second lighting position (e.g., such as one of the lighting positions 331B-331H of FIGS. 9A and 9B) of a lighting configuration and a corresponding second contrast focus curve 801. For simplicity of the illustrations, each of the image stacks ISL1 and ISL2 include only 4 images, as corresponding to Z heights of Z(1)-Z(4) (e.g., which in one example in relation to the illustration of FIGS. 6A and 6B may be considered as similar to the Z heights of Z(5)-Z(8) of FIGS. 6A and 6B), although as noted above such image stacks in various implementations may include many more images.

In the illustrations of FIGS. 6B, 7B and 8B, in one simplified example implementation the images in each image stack may each be designated as having an area of 9×9 pixels. In such an example, a center pixel in each image may have coordinates of (5, 5), and the four corner pixels may have coordinates of (1, 1), (1, 9), (9, 1) and (9, 9), respectively (e.g., in accordance with the position of the respective pixel along the x-axis and y-axis of the pixel array). A central region of interest (e.g., ROI(1)) may have an area of 3×3 pixels, with the four corner pixels having coordinates of (4, 4), (4, 6), (6, 4) and (6, 6), respectively, and the center pixel at coordinates (5, 5). It will be appreciated that while the images in this example are indicated as having an area of only 9×9 pixels, in various implementations (e.g., in certain actual embodiments) images and/or corresponding fields of view may have many more pixels (e.g., in some instances with thousands or millions of pixels, such as a 1280×1024 pixel array, etc.)

Similar to FIGS. 6B, for each pixel position, for each image stack ISL1 and ISL2, for each captured image(i), a focus metric value $fm(k,i)$ (e.g., $L1fm(k,i)$ for ISL1 and $L2fm(k,i)$ for ISL2) may be calculated based on a region or sub-region of interest ROI(k) (e.g., a set of pixels) in the image and related to the corresponding focus position Z(i) (e.g., of the camera or as corresponding to the operations of the VFL lens) along the Z axis at the time that the image was captured. This results in focus curve data (e.g., the focus metric values $fm(k,i)$ at the positions Z(i), which is one type of focus peak determining data set), which may be referred to simply as a "focus curve".

In the illustrated examples, each of the image stacks ISL1 and ISL2 includes a plurality of images (e.g., 4 images) of a workpiece for which each image corresponds to a different focus position (e.g., focus positions Z(1) to Z(4)) along the optical axis OA. Thus, for each focus position the plurality of image stacks (e.g., image stacks ISL1 and ISL2) includes a set of images with one image from each image stack corresponding to the respective focus position (e.g., a first set of images includes images IMGL1(1) and IMGL2(1) at the focus position Z(1), a second set of images includes images IMGL1(2) and IMGL2(2) at the focus position Z(2), a third set of images includes images IMGL1(3) and IMGL2(3) at the focus position Z(3), and a fourth set of images includes images IMGL1(4) and IMGL2(4) at the focus position Z(4)). The image stacks ISL1 and ISL2 each image the same field of view and area of the workpiece. Each image has associated pixel intensity values (e.g., for each of the 9×9 pixels in the pixel array) for which each pixel intensity value corresponds to a pixel position (e.g., the pixel position at the center of the ROI(1)) and the focus position of the respective image, such as one of the focus positions Z(1) to Z(4)).

The plurality of image stacks (e.g., image stacks ISL1 and ISL2) comprises a set of pixel intensity values for each pixel position and focus position with one pixel intensity value of the set coming from each image stack. For example, for the plurality of image stacks (e.g., image stacks ISL1 and ISL2), for the pixel position at the center of the ROI(1), at the focus position Z(1), the image IMGL1(1) has a first pixel intensity value and the image IMGL2(1) has a second pixel intensity value. As will be described in more detail below, in accordance with principles as described herein, in some instances the first pixel intensity value may have resulted from glare issues (e.g., from a reflected lighting portion such as reflected by the workpiece surface), for which the first pixel intensity value may be relatively high, and a glare reduction process may be utilized (e.g., which may include utilizing the second pixel intensity value either individually or in combination with other pixel intensity values from other image stacks, such as may be included in a composite stack, and such as instead of utilizing the first pixel intensity value as part of further processing).

In further regard to the set of pixel intensity values noted above, for the plurality of image stacks (e.g., image stacks ISL1 and ISL2), for the pixel position at the center of the ROI(1), at the focus position Z(2), the image IMGL1(2) has a first pixel intensity value and the image IMGL2(2) has a second pixel intensity value. Similarly, for the pixel position at the center of the ROI(1), at the focus position Z(3), the image IMGL1(3) has a first pixel intensity value and the image IMGL2(3) has a second pixel intensity value. Similarly, for the pixel position at the center of the ROI(1), at the focus position Z(4), the image IMGL1(4) has a first pixel intensity value and the image IMGL2(4) has a second pixel intensity value. Thus, for each pixel position and focus position, one pixel intensity value of the set of pixel intensity values comes from each image stack. As will be described in more detail below with respect to FIG. 12, in an example where 8 image stacks are acquired (e.g., as compared to the 2 image stacks of FIGS. 7B and 8B), for each pixel position and focus position, there may be 8 corresponding pixel intensity values of the set (i.e., one from each of the 8 image stacks).

In FIG. 7A, for the focus curve 701, the focus curve peak PKL1 in this example is indicated as being at the focus position Z(2). In FIG. 8A for the focus curve 801, the focus curve peak PKL2 in this example is similarly indicated as being at the focus position Z(2). Thus, for each of the focus curves 701 and 801, the corresponding surface point on the workpiece is indicated to be at a same focus position/Z height of Z(2). In various implementations, the contrast focus curves 701 and 801 may be considered as having certain similar characteristics as the portions of the focus curves FCL1 and FCL2 that include the workpiece surface peaks WSPK1 and WSPK2, respectively, as illustrated in FIG. 13B, as will be described in more detail below. In various implementations, image stacks that are captured utilizing different workpiece lighting (e.g., including light from different lighting positions) may each indicate a same focus position of a corresponding surface point, but for which certain benefits may be achieved through the capturing of the multiple image stacks.

For example, as will be described in more detail below, in some instances glare (e.g., from reflection of light from a first lighting position which is utilized for the acquisition of a first image stack) may cause certain issues at a first corresponding location in the first image stack (e.g., for which the issues may result in the image stack data for the location not accurately indicating the focus position of the corresponding surface point on the workpiece at the location). To address such issues, in accordance with principles as described herein, one or more additional image stacks may be acquired utilizing light from different lighting positions (e.g., a second image stack may be acquired utilizing light from a second lighting position), for which the glare issues may not occur at the first corresponding location (e.g., in the second image stack). Image stack data for the first corresponding location from the one or more additional image stacks (e.g., from the second image stack) may be utilized in place of or otherwise to address the issues with the image stack data for the first corresponding location from the first image stack. Thus, the acquiring of multiple image stacks (e.g., such as image stacks ISL1 and ISL2) utilizing light from different lighting positions may be beneficial (e.g., enabling image stack data to be determined that may be utilized as part of a process for addressing glare issues, etc.), as will be described in more detail below.

In various implementations, a first image stack may be acquired utilizing first workpiece lighting which comprises light from a first lighting position, and which in some instances may also include light from one or more additional lighting positions of a lighting configuration. Similarly, a second image stack may be acquired utilizing second workpiece lighting which comprises light from a second lighting position, and which in some instances may also include light from one or more additional lighting positions of a lighting configuration. For example, in relation to the configuration of FIGS. 9A and 9B which will be described in more detail below, in one implementation first workpiece lighting may comprise light from lighting positions 330A-330D, and second workpiece lighting may comprise light from lighting positions 330E-330H.

In some implementations, workpiece lighting that is utilized for the acquisition of an image stack may include light from some or all of the lighting positions of a lighting configuration (e.g., where in some instances the lighting levels/brightness settings and/or other settings for each of the lighting portions may be controlled to provide different amounts of light from the different lighting positions as part of a given workpiece lighting, etc.). For example, in relation to a first lighting position that results in glare issues (e.g., corresponding to a first imaged lighting portion) in a first image stack, for a second image stack acquired utilizing second workpiece lighting, the majority of the light in the second workpiece lighting may be from a second lighting position and/or from additional lighting positions, but with little or no light from the first lighting position (e.g., to avoid having significant glare occurring as corresponding to significant light from the first lighting position). Similarly, for first workpiece lighting utilized for acquiring the first image stack, the majority of the light in the first workpiece lighting may be from the first lighting position and/or from additional lighting positions, but with little or no light from the second lighting position (e.g., to avoid having significant glare occurring as corresponding to significant light from the second lighting position).

Figure 9A:
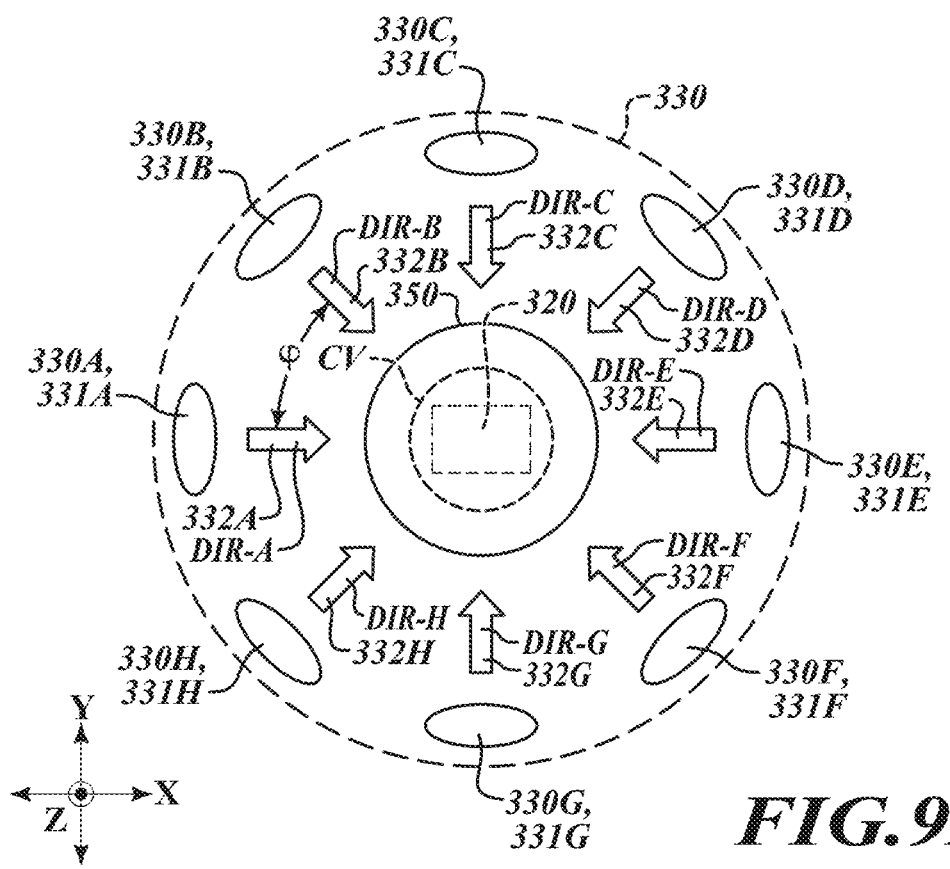
FIGS. 9A and 9B are diagrams of an exemplary implementation of a lighting configuration with eight lighting portions at eight corresponding lighting positions.
Figure 9B:
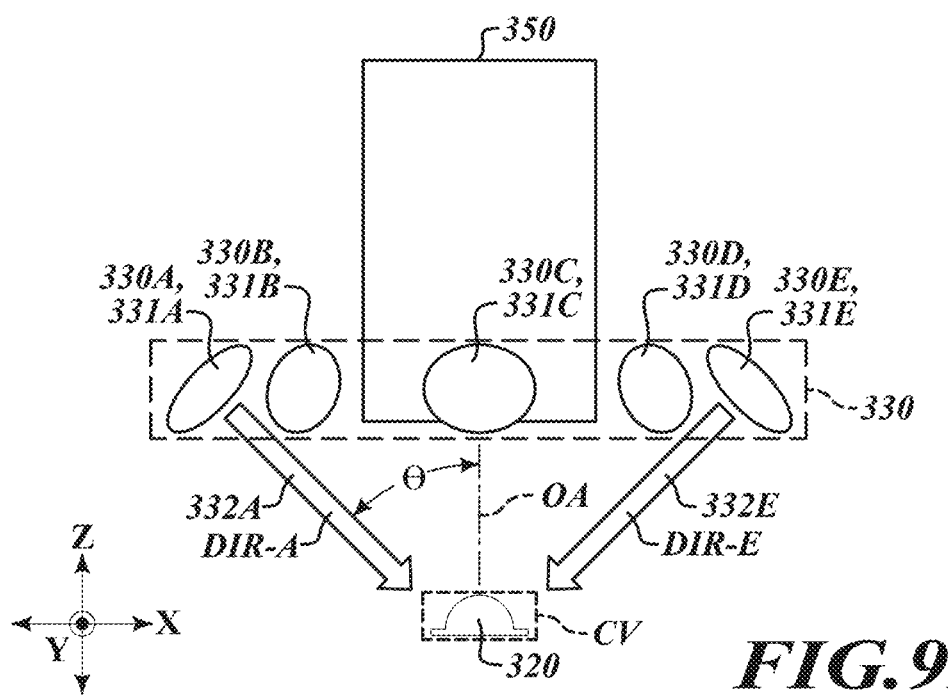

FIGS. 9A and 9B illustrate a lighting configuration 330 which includes eight lighting portions 330A-330H at eight lighting positions 331A-331H, respectively, which are configured to illuminate the workpiece 320 for producing image light (e.g., as described above with respect to FIGS. 2 and 3, etc.). As illustrated in FIGS. 9A and 9B (i.e., which show a top view and a side view, respectively), the lighting portions 330A-330H are distributed in an arrangement in which each lighting portion is configured to direct light toward the central volume CV (e.g., in which at least part of the workpiece 320 may be located). In accordance with this arrangement, each lighting portion 330A-330H directs light 332A-332H in a corresponding direction DIR-A to DIR-H, respectively. In FIG. 9B, for simplicity of the illustration, only the light 332A and 332E from the lighting portions 330A and 330E are illustrated as directed in the directions DIR-A and DIR-E, respectively.

In the example of FIGS. 9A and 9B, the arrangement in which the lighting portions are distributed is an annular arrangement in which each lighting portion is located at a different angular position within the annular arrangement. In relation to a 360 degree reference for positioning within the annular arrangement, the eight lighting portions 330A-330H are located at 45 degree increments around the 360 degree annular reference configuration (e.g., as each corresponding to a respective angle φ, such as an angle $\varphi_A$ of 0 degrees for lighting portion 330A, an angle $\varphi_B$ of 45 degrees for lighting portion 330B, an angle $\varphi_C$ of 90 degrees for lighting portion 330C, etc.). In various implementations, a lighting configuration as utilized as described herein may include a ring light, for which each lighting portion may include a section of the ring light, or one more LEDs of a ring light that is formed of LEDs, etc.

In various implementations, light received at the workpiece 320 from each lighting portion may be considered directional in that the light from the respective lighting position (e.g., lighting positions 331A to 331H) travels along a respective direction (e.g., direction DIR-A to DIR-H) toward the workpiece. For example, first directional light 332A (i.e., from lighting portion 330A at lighting position 331A) travels along the direction DIR-A toward the workpiece, and second directional light 332B (i.e., from lighting portion 330B at lighting position 331B) travels along the direction DIR-B toward the workpiece, and so on for third to eighth directional light 332C to 332H travelling along respective directions DIR-C to DIR-H toward the workpiece. In some implementations, such lighting directions DIR-A to DIR-H may be referenced as at least partially corresponding to radial lighting directions in relation to the workpiece.

As will be described in more detail below with respect to FIGS. 10A-17, a glare reduction process may be utilized to address certain issues. In various implementations, such issues may occur in relation to points-from-focus (PFF) type processes, which as noted above may include collecting a stack of images of a workpiece at different focus positions/ Z-heights, followed by application of certain processing (e.g., including determining and processing focus curve data, etc.) such as may be utilized for determining three dimensional positions of a plurality of surface points on the workpiece (e.g., for reconstructing a three dimensional shape of the workpiece surface). As part of such processing, the efficiency/quality of the determination of the three dimensional positions of the surface points on the workpiece (e.g., as may be utilized for the shape reconstruction) may depend at least in part on the acquisition and utilization of accurate data that corresponds to the surface points on the workpiece, as opposed to data that may result from undesirable affects (e.g., due to glare issues, such as may occur due to imaged lighting portions that may appear as ghost images, or stray light, etc.). As described herein, such issues may at least in part be addressed by acquiring a set of image stacks utilizing different workpiece lighting which comprises light from different lighting positions. In accordance with one characterization, a glare reduction process (e.g., which includes processing of the acquired image stack data) may be characterized as being based on the concept that when the same workpiece is imaged utilizing light in different lighting positions, unwanted imaged lighting portions (e.g., mirror images of the lighting portions) will be in different positions in the images.

For example, if when a first image stack is acquired utilizing a first lighting portion at a first lighting position (e.g., for which the first lighting portion is reflected off of a surface of the workpiece), a mirror image of the first lighting portion may appear in a particular first position in the images of the first image stack. Similarly, if a second image stack is acquired utilizing a second lighting portion in a second lighting position (e.g., and for which the first lighting portion is turned off), there may be no mirror image of the first lighting portion in the second image stack, but for which the second image stack may include a mirror image of the second lighting portion at a second corresponding position within the images. In such different image stacks, since the imaging of the workpiece does not otherwise change, the correct image data corresponding to the surface of the workpiece may be utilized from the different image stacks, and the image data corresponding to the imaged lighting portions (e.g., the mirror images of the lighting portions) may be removed or reduced by processing or otherwise not utilized (e.g., in accordance with a glare reduction process, etc.). In various implementations, such techniques may be particularly advantageous when utilized in relation to workpieces that may have relatively reflective surfaces (e.g., corresponding in some instances to smooth surfaces, etc.) and/or with certain levels of complexity (e.g., where the workpiece surfaces vary with position such that accurate determination of the three dimensional positions of the surface points on the workpiece may be particularly important for accurately determining/measuring a shape of the workpiece, etc., such as for ensuring that a manufactured workpiece is within required tolerances, etc.) Such techniques will be described in more detail below with respect to FIGS. 10A-17.

Figure 10A:
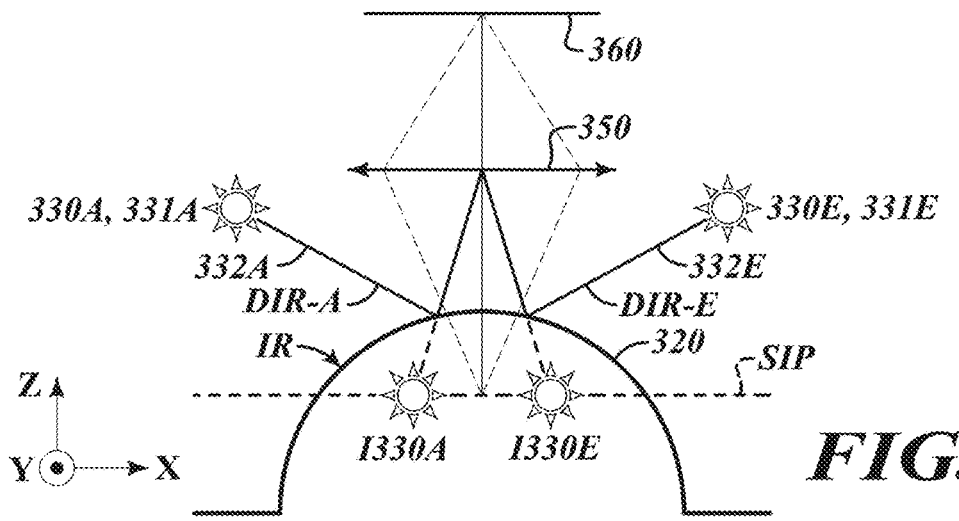
FIGS. 10A-10C are diagrams illustrating utilization of lighting portions at different lighting positions for providing different workpiece lighting for illuminating a workpiece and glare issues caused by imaged lighting portions.
Figure 10B:
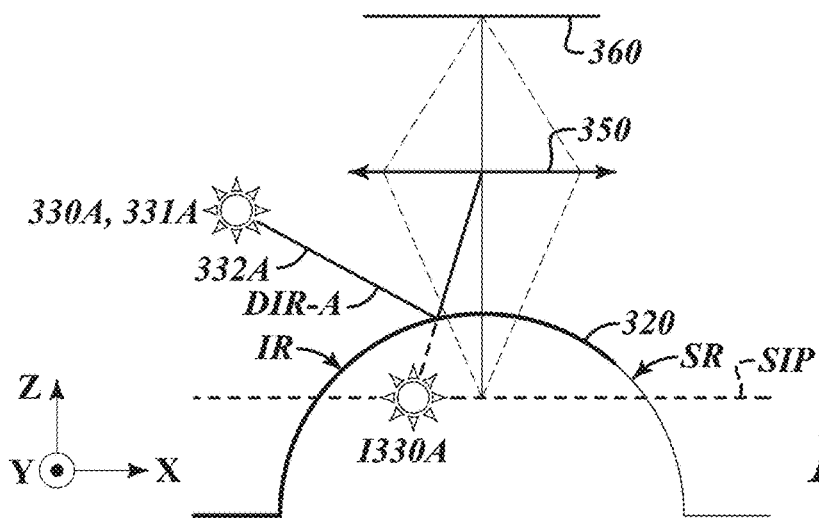
Figure 10C:
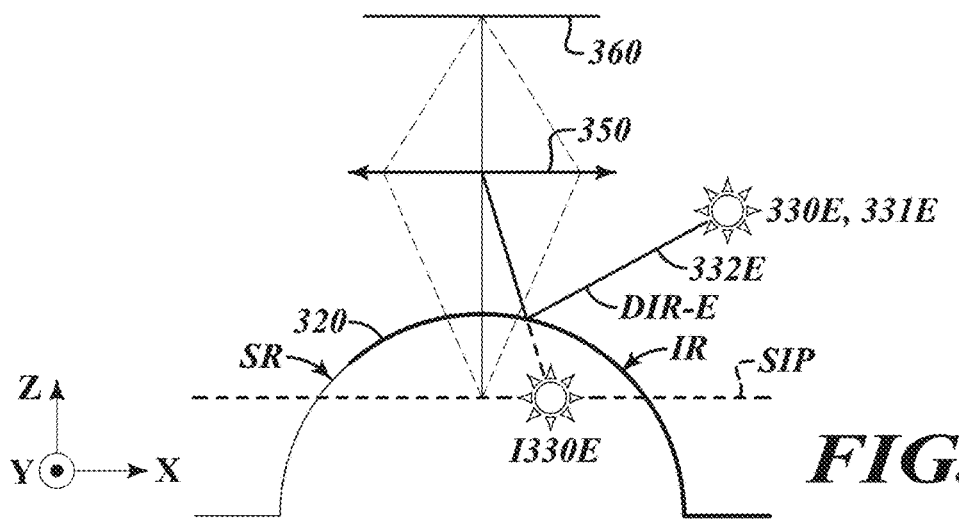

FIGS. 10A-10C are diagrams illustrating a metrology system (e.g., which in various implementations may be similar to that of FIGS. 1-3) with representations of a lighting configuration (e.g., including lighting portions 330A and 330E) and the objectives lens 350 and the camera 360 (e.g., and for which it will be appreciated that additional intervening components may be included such as illustrated in FIG. 3). As shown in FIG. 10A, the lighting portions 330A and 330E at respective lighting positions 331A and 331E are utilized for providing workpiece lighting for illuminating the workpiece 320. Due to reflections from the surface of the workpiece 320, imaged lighting portions I330A and I330E are produced (e.g., which may also be referenced in some implementations as glare, or glare spots, or ghost images I330A and I330E). As will be described in more detail below with respect to FIGS. 11A-11C, the imaged lighting portions I330A and I330E are illustrated in relation to a single image plane SIP in the examples of FIGS. 10A-10C.

In the example of FIG. 10B, only the lighting portion 330A at the lighting position 331A is utilized for illuminating the workpiece 320. As a result, only the imaged lighting portion I330A is produced. In the example of FIG. 10C, only the lighting portion 330E at the lighting position 331E is utilized for illuminating the workpiece 320. As a result, only the imaged lighting portion I330E is produced.

As shown in FIG. 10A, due to the utilization of the lighting portions 330A and 330E at the lighting positions 331A and 331E on opposite sides of the workpiece 320, the entire surface of the workpiece 320 that is illustrated in FIG. 10A is characterized as an illuminated region IR (e.g., as illuminated by the lighting). In FIG. 10B, due to the utilization of only the lighting portion 330A at the lighting position 331A on the left side of the workpiece 320, a part of the surface of the workpiece 320 (e.g., starting on the left side) is characterized as an illuminated region IR, and a part of the surface of the workpiece 320 on the far right side, which is opposite to the side of the lighting portion 330A, is characterized as a shadow region SR (e.g., with the region being in a relative shadow in relation to the light 332A). Similarly, in FIG. 10C, due to the utilization of only the lighting portion 330E at the lighting position 331E on the right side of the workpiece 320, a part of the surface of the workpiece 320 (e.g., starting on the right side) is characterized as an illuminated region IR, and a part of the surface of the workpiece 320 on the far left side, which is opposite to the side of the lighting portion 330E, is characterized as a shadow region SR. In various implementations, as will be described in more detail below with respect to FIGS. 11A-11C, certain portions of the image data of FIGS. 10B and 10C may be utilized in combination as part of data that correctly corresponds to the surface points on the workpiece 320 and does not correspond to the imaged lighting portions I330A and I330E.

Figure 11A:
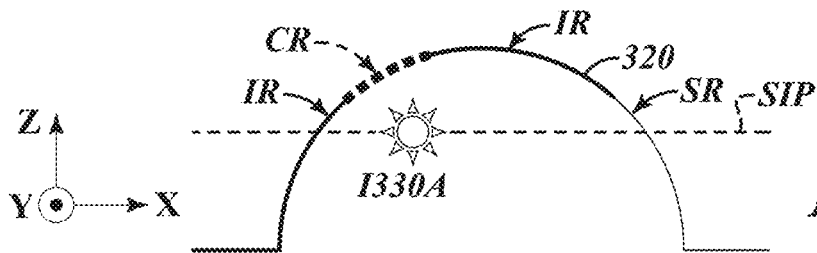
FIGS. 11A-11C are diagrams illustrating representations of image stack data resulting from the lighting portions at the different lighting positions of FIGS. 10A-10C.
Figure 11B:
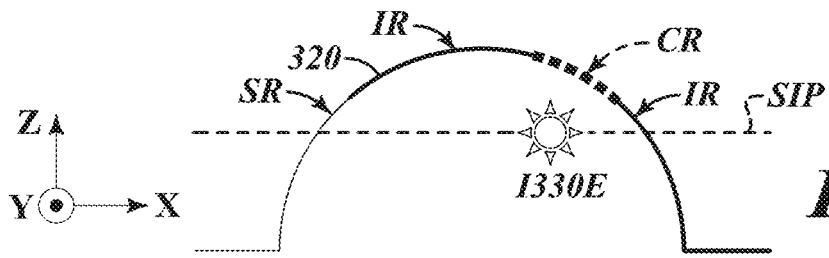
Figure 11C:
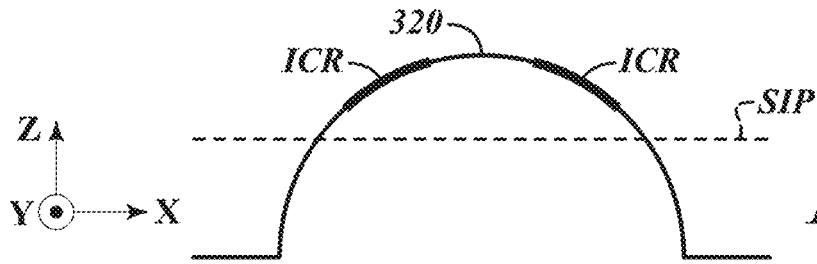

FIGS. 11A-11C are diagrams illustrating representations of image stack data resulting from the lighting portions at the different lighting positions of FIGS. 10B and 10C. For example, FIG. 11A pictorially represents first image stack data corresponding to a first image stack that is acquired utilizing the configuration of FIG. 10B, including utilizing workpiece lighting (e.g., which may be referenced as first workpiece lighting in this example) which comprises light 332A from the first lighting position 331A (e.g., and which in certain implementations may not include light 332E from the second lighting position 331E). In the first image stack, one of the images corresponds to the single image plane SIP, and for which the Z axis position of the center of the imaged lighting portion I330A is at the single image plane SIP. Due to the imaged lighting portion I330A (e.g., and the corresponding glare issues), part of the surface of the workpiece 320 in the image stack data is characterized as a challenging region CR.

For example, as will be described in more detail below with respect to FIGS. 13A and 13B, the imaged lighting portion I330A may cause certain issues in relation to the focus curve data, such as producing a peak in a focus curve which corresponds to the imaged lighting portion, rather than to the location of the corresponding surface point on the workpiece. This may cause the system to determine an incorrect three dimensional position for the corresponding surface point on the workpiece, such that the overall shape of the workpiece surface may be incorrectly determined. In this regard, a focus peak corresponding to the imaged lighting portion I330A may be referenced in some implementations as an improper peak, or a ghost peak, etc., while a focus peak corresponding to the surface point on the workpiece may be referenced in some implementations as a proper peak.

As illustrated in FIG. 11A, other than the challenging region CR which results from the reflection of the lighting portion 330A at the lighting position 331A (i.e., as corresponding to the imaged lighting portion I330A), the image stack data corresponding to the other portions of the workpiece surface that are illuminated by the lighting portion 330A are illustrated as illuminated regions IR. The image stack data corresponding to the far right of the surface of the workpiece 320 is illustrated as a shadow region SR (e.g., given its location on the far side of the workpiece 320 relative to the lighting portion 330A). As will be described in more detail below (e.g., with respect to FIG. 11C), image stack data from different image stacks (e.g., including certain image stack data that corresponds to illuminated regions IR) may be utilized in combination (e.g., as may result in improved contrast regions, etc.).

FIG. 11B pictorially represents second image stack data corresponding to a second image stack that is acquired utilizing the configuration of FIG. 10C, including utilizing workpiece lighting (e.g., which may be referenced as second workpiece lighting in this example) which comprises light 332E from the second lighting position 331E (e.g., and which in certain implementations may not include light 332A from the first lighting position 331A). In the second image stack, one of the images corresponds to the single image plane SIP, and for which the Z axis position of the center of the imaged lighting portion I330E is at the single image plane SIP. Due to the imaged lighting portion I330E (e.g., and the corresponding glare issues), part of the surface of the workpiece 320 in the image stack data is characterized as a challenging region CR. The imaged lighting portion I330E may result in similar issues as those described above with regard to imaged lighting portion I330A (e.g., as may result in an improper peak in focus curve data, etc.).

As illustrated in FIG. 11B, other than the challenging region CR which results from the reflection of the lighting portion 330E at the lighting position 331E (i.e., as corresponding to the imaged lighting portion I330E), the image stack data corresponding to the other portions of the workpiece surface that are illuminated by the lighting portion 330E are illustrated as illuminated regions IR. The image stack data corresponding to the far left of the surface of the workpiece 320 is illustrated as a shadow region SR (e.g., given its location on the far side of the workpiece 320 relative to the lighting portion 330E). As will be described in more detail below (e.g., with respect to FIG. 11C), image stack data from different image stacks (e.g., including portions of image stack data that correspond to illuminated regions IR) may be utilized in combination (e.g., as may result in improved contrast regions, etc.).

As pictorially represented in FIG. 11C, by combining certain portions of the image stack data from the first and second image stacks of FIGS. 11A and 11B, a composite stack may be created with improved contrast regions ICR in place of the challenging regions CR of FIGS. 11A and 11B. More specifically, it is noted that the image stack data of FIG. 11A does not include the issues resulting from the imaged lighting portion I330E, and the image stack data of FIG. 11B does not include the issues resulting from the imaged lighting portion I330A, for which at least some of the data from each of the image stacks may be utilized to form a composite stack which does not include the issues resulting from either of the imaged lighting portions I330A or I330E. For example, as pictorially indicated in FIG. 11C, an improved contrast region ICR on the left results from not utilizing the image stack data of FIG. 11A for that region (i.e., for the challenging region CR illustrated in FIG. 11A), and instead utilizing the image stack data from FIG. 11B for that region (i.e. which does not have the issues resulting from the imaged lighting portion I330A). Similarly, an improved contrast region ICR on the right results from not utilizing the image stack data of FIG. 11B for that region (i.e., for the challenging region CR illustrated in FIG. 11B), and instead utilizing the image stack data from FIG. 11A for that region (i.e. which does not have the issues resulting from the imaged lighting portion I330E). As will be described in more detail below (e.g., with respect to FIG. 12, etc.) in various implementations, additional lighting portions at corresponding lighting positions may be utilized for the acquisition of image stacks, such that additional image stack data may be available for utilization for forming a composite stack (e.g., with improved contrast regions, etc.).

Figure 12:
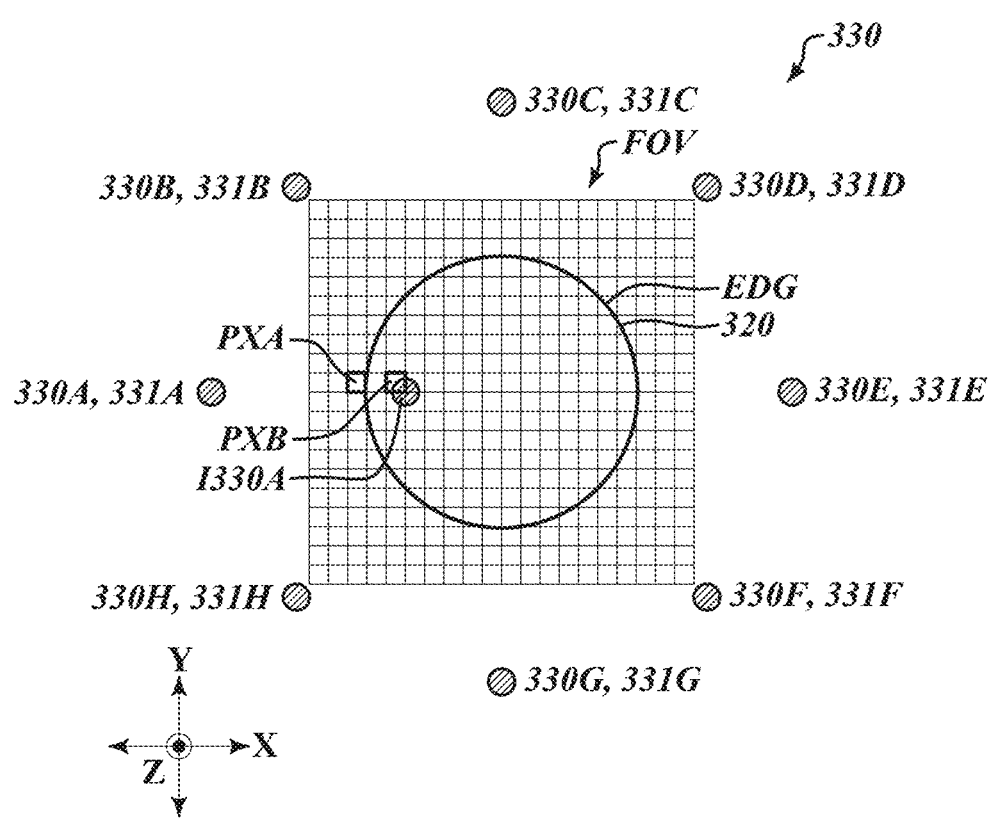
FIG. 12 is a diagram illustrating a top view of a lighting configuration with lighting portions at different lighting positions and a workpiece in a field of view with certain representative pixels shown in relation to an imaged lighting portion.

In general, such acquired image stacks as described herein may each image the same field of view and area of the workpiece. For example, as will be described in more detail below, the illustration of FIG. 12 shows a field of view (FOV) as including the spherical portion of the workpiece 320 in the center of the FOV, and for which each of the image stacks will image that same FOV. In addition, for each focus position, the plurality of image stacks includes a set of images with one image from each image stack corresponding to the respective focus position. In accordance with examples as described herein, if 8 image stacks are included in the plurality of image stacks, each with 80 images (i.e., as corresponding to 80 focus positions), then the plurality of image stacks (i.e., in combination) will for each of the 80 focus positions include a set of 8 images (i.e., with one image from each image stack corresponding to the respective focus position).

FIG. 12 is a diagram illustrating a top view of a lighting configuration 330 with representations of lighting portions 330A-330H at different respective lighting positions 331A-331H (e.g., with similarities to FIG. 9A). Also illustrated is a top view of a spherical portion of a workpiece 320 in a field of view FOV with certain representative pixels PXA and PXB shown in relation to an imaged lighting portion I330A (e.g., similar to the imaged lighting portion I330A of FIG. 10B, although with slightly different positioning closer to the edge EDG of the spherical portion of the workpiece 320). The lighting configuration 330 includes the eight lighting portions 330A-330H at the eight lighting positions 331A-331H, respectively, which are configured to illuminate the workpiece 320 for producing image light (e.g., as described above with respect to FIGS. 2, 3, 9A and 9B). The lighting portions 330A-330H are distributed in an arrangement in which each lighting portion is configured to direct light toward a central volume (e.g., in which at least part of the workpiece 320 may be located). The arrangement in which the lighting portions 330A-330H are distributed is an annular arrangement in which each lighting portion is located at a different angular position within the annular arrangement. In relation to a 360 degree reference for positioning within the annular arrangement, the eight lighting portions 330A-330H are located at 45 degree increments around the 360 degree annular reference configuration.

In the illustration of FIG. 12, the field of view FOV (e.g., as corresponding to/imaged by each of the images of an image stack) may be designated as having an area of 20×20 pixels (i.e., for a total area of 400 pixels). Pixel PXA may be designated as having coordinates of (3, 11) and pixel PXB may be designated as having coordinates of (5, 11) (e.g., in accordance with the position of the respective pixel along the x-axis and y-axis of the pixel array). The four corner pixels of the 20×20 pixel array corresponding to the field of view FOV may have coordinates of (1, 1), (1, 20), (20, 1) and (20, 20), with the remaining pixels (i.e., out of the total of 400 pixels) in the array having corresponding coordinates in accordance with their respective pixel positions.

In one example (e.g., as will be described in more detail below with respect to FIG. 13A), each image stack may have a total of 80 images (i.e., with each image corresponding to a respective focus position, for a total of 80 focus positions with images captured throughout the focus range). In an example where each image stack is captured utilizing only one of the 8 lighting positions of FIG. 12 (e.g., lighting positions 331A-331H), there may be 8 image stacks. In such an example, each of the 8 image stacks will have 80 images (e.g., for a combined total of 640 images, with a total of 8 images at each of the 80 focus positions). Each image will include a pixel PXA (e.g., at coordinates 3, 11) and a pixel PXB (e.g., at coordinates 5, 11), such as illustrated in FIG. 12, as well as the corner pixels and other remaining pixels as part of the 20×20 pixels (i.e., 400 pixels) in the pixel array.

In various implementations, intensity values and/or other values may be determined for each of the pixels in each of the images (i.e., with each image corresponding to a focus position) in each of the image stacks. For example, each image may have associated pixel intensity values for which each pixel intensity value corresponds to a pixel position and the focus position of the respective image. The image stacks in combination may thus include a set of pixel intensity values for each pixel position and focus position with one pixel intensity value of the set coming from each image stack. In such an implementation in which there are 8 image stacks, the set of pixel intensity values may include 8 pixel intensity values for each pixel position and focus position. As some example values in relation to FIG. 12, at a certain focus position, for the pixels PXA and PXB the 8 pixel intensity values (i.e., in order of the 1st to the 8th image stacks, as captured utilizing the lighting portions 330A to 330H, respectively) may be: pixel PXA: 40, 20, 5, 0, 0, 0, 5, 20; and pixel PXB: 127, 0, 0, 0, 0, 0, 0, 0. In addition to the pixels PXA and PXB, it will be appreciated that each of the remaining 398 pixels (i.e., in the 20×20 pixel array) will similarly have a corresponding set of 8 pixel intensity values for each focus position (e.g., with the 80 focus positions as corresponding to the 80 images in each image stack).

In accordance with principles as described herein, the sets of pixel intensity values may be utilized to determine a composite stack (e.g., which includes one pixel intensity value for each corresponding pixel position and focus position). In various implementations, at least some of the pixel intensity values of the composite stack are determined according to a glare reduction process which is configured to determine a corresponding pixel intensity value for the composite stack that is less than a maximum pixel intensity value of the corresponding set of pixel intensity values.

As an example, in a first image stack which is acquired utilizing first workpiece lighting which comprises light 332A from the first lighting position 331A, glare from reflection of the light from the first lighting position 331A results in a first pixel intensity value (e.g., pixel intensity value 127 for pixel PXB) which is a first maximum pixel intensity value in a first set of pixel intensity values (e.g., for pixel PXB: 127, 0, 0, 0, 0, 0, 0, 0, where 127 is the maximum intensity value in the set) corresponding to a first pixel position (e.g., pixel PXB) and a first focus position. More specifically, in the first image stack which is acquired utilizing first workpiece lighting which comprises light 332A from the lighting portion 330A at the first lighting position 331A, at the above noted focus position, the reflection of the lighting portion 330A off of the surface of the workpiece 320 results in the corresponding imaged lighting portion I330A (e.g., which may also be referenced as glare, or a glare spot I330A, or ghost image I330A of the lighting portion 330A in some implementations) appearing in the image (e.g., such as illustrated in FIGS. 10B, 11A, 12 and 13B). As will be described in more detail below (e.g., with respect to FIGS. 13A and 13B, etc.), such glare issues, if not addressed, may result in inaccurate focus curve data, which may correspondingly indicate inaccurate three dimensional positions of surface points on the workpiece 320.

As noted above, in accordance with principles as described herein, a glare reduction process may be configured to determine a corresponding pixel intensity value for a composite stack that is less than a maximum pixel intensity value of the corresponding set of pixel intensity values. In relation to the above noted set of pixel intensity values (e.g., for pixel PXB: 127, 0, 0, 0, 0, 0, 0, 0), this may correspond to determining a pixel intensity value for the composite stack that is less than the maximum pixel intensity value of 127. Similarly, for pixel PXA, for the above example values (e.g., for pixel PXA: 40, 20, 5, 0, 0, 0, 5, 20), this may correspond to determining a pixel intensity value for the composite stack that is less than the maximum pixel intensity value of 40 (e.g., for which the pixel intensity value of 40 may have resulted from partial glare due to the proximity of pixel PXA to pixel PXB and the imaged lighting portion I330A and/or from other glare issues, etc.).

In various implementations, the glare reduction process comprises utilizing an intensity determination process as applied to at least some of the pixel intensity values of the corresponding set of pixel intensity values to determine the corresponding pixel intensity values of the composite stack (e.g., for which in some implementations focus curve determinations and analysis etc. as described above with respect to FIGS. 6A and 6B may be performed in relation to the composite stack data, etc.). In various implementations, the intensity determination process may include a selection process (e.g., a median selection process, etc.) which selects a value (e.g., a median value) of the set of pixel intensity values to be utilized as the corresponding pixel intensity value of the composite stack. In instances with an even number of image stacks, the median selection process may determine the median as an average of the two middle values. For pixels PXA and PXB in the above noted examples, this would result in median intensity values of 5 and 0, respectively, which would be utilized for the intensity values of pixels PXA and PXB at the designated focus position in the composite stack. As another numerical example utilizing a median selections process, if 5 image stacks were acquired, and with a given pixel position having 5 corresponding pixel intensity values such as 5, 6, 10, 30, 60, the median selection process may select the pixel intensity value of 10. In such an example, the pixel intensity value of 60 may correspond to an imaged lighting portion (e.g., a glare spot).

In various implementations, the intensity determination process may include a calculation process (e.g., an averaging process or other process, such as which utilizes two or more values of the set of pixel intensity values to determine a value to be utilized as the corresponding pixel intensity value of the composite stack). For example, an averaging process may utilize at least two pixel intensity values of the set of pixel intensity values for an average calculation (e.g., a simple average calculation or a weighted average calculation, etc.) to determine the corresponding pixel intensity value of the composite stack. In relation to the above noted intensity values for pixels PXA and PXB, as one illustrative example an average of the 4 middle values may be utilized (e.g., for pixel PXA this may correspond to (0+5+5+20)/4=7.5, and for pixel PXB this may correspond to (0+0+0+0)/4=0.0, to be utilized for the intensity values of pixels PXA and PXB at the designated focus position in the composite stack.

Once the composite stack is determined, focus curve data may be determined based at least in part on (e.g., based on an analysis of) the pixel intensity values of the composite stack, wherein the focus curve data indicates three dimensional positions of a plurality of surface points on the workpiece. In various implementations, a process such as that described above with respect to FIGS. 6A and 6B may be utilized, wherein the composite stack (e.g., or a processed version thereof) is the stack (e.g., the image stack) which is utilized for determining the focus curve data (e.g., including or based on determined focus metric values, such as may be based on contrast, etc.).

It will be appreciated that a glare reduction process (e.g., as described above) may reduce the likelihood that pixel intensity values that result from glare issues may be included in the data utilized to determine focus curve data, which could otherwise result in inaccurate determinations of the three dimensional positions of surface points on the workpiece (e.g., as will be described in more detail below with respect to FIGS. 13A and 13B, etc.). For example, with respect to the above noted example intensity values for pixels PXA and PXB, in accordance with the glare reduction process, the first intensity values of 40 and 127 (e.g., which may have at least in part resulted from glare issues from the lighting position 331A of the lighting portion 330A which resulted in the imaged lighting portion I330A), may not be included and/or may otherwise be processed so as to not significantly affect the values of the composite stack as determined by the intensity determination processes as described above.

Figure 13A:
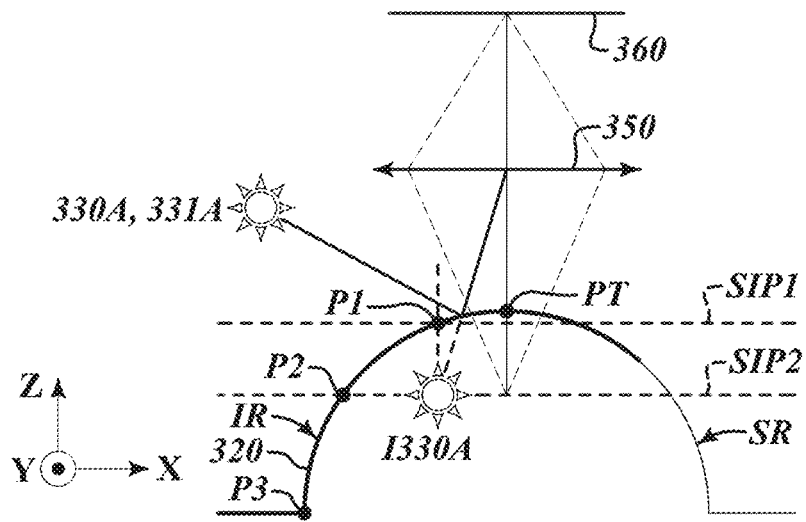
FIGS. 13A and 13B are diagrams illustrating an imaged lighting portion and a resulting contrast focus curve with multiple peaks.
Figure 13B:
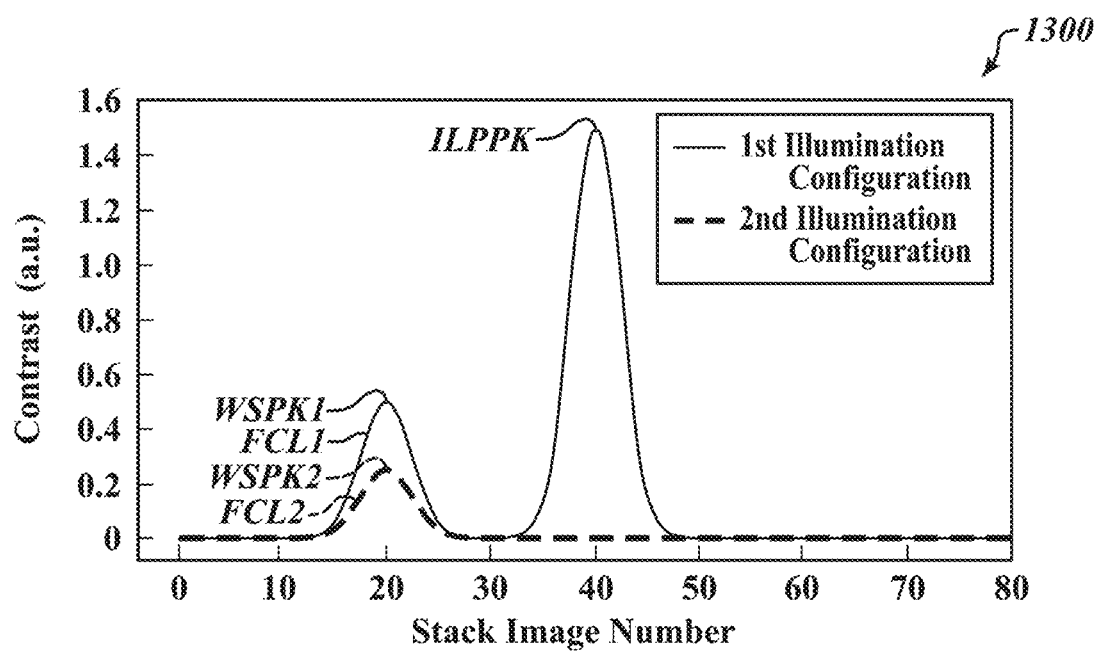

FIGS. 13A and 13B are diagrams illustrating an imaged lighting portion I330A (e.g., corresponding to a glare spot) and a resulting contrast focus curve FCL1 with multiple peaks. As shown in FIG. 13A (i.e., which is a side view with similarities to FIG. 10B), the lighting portion 330A at the lighting position 331A is utilized for providing workpiece lighting for illuminating the workpiece 320 for acquiring a first image stack. Due to reflection of the lighting from the surface of the workpiece 320, an imaged lighting portion I330A is produced (e.g., which may also be referenced in some implementations as glare, or a glare spot, or a ghost image, etc.).

As illustrated in FIG. 13A and as described above with respect to FIG. 3, the workpiece 320 may have surface points P1, P2, and P3, as well as a top surface point PT. In the example of FIG. 13A, the center of the imaged lighting portion I330A is at a same X, Y location in a field of view as the surface point P1 (e.g., the surface point P1 and the center of the imaged lighting portion I330A are each at a same X, Y pixel location within the field of view, but each have a different Z axis location). Correspondingly, when the first image stack is acquired (i.e., with the surface point P1 and the imaged lighting portion I330A at the same approximate pixel location within the field of view), as illustrated in FIG. 13B a focus curve FCL1 may result for the corresponding X, Y pixel location of the surface point P1 (e.g., wherein the contrast focus curve FCL1 may be conceptually similar to the contrast focus curve 601 of FIG. 6A, except with multiple peaks).

As illustrated, the focus curve FCL1 includes a workpiece surface peak WSPK1 which is centered/located at focus curve data corresponding to a stack image number 20 (e.g., corresponding to a number of the image in the corresponding image stack and a corresponding focus position/Z height), and an imaged lighting portion peak ILPPK which is centered/located at focus curve data corresponding to a stack image number 40. The stack image number 20 of FIG. 13B corresponds to a first single image plane SIP1 of FIG. 13A, which corresponds to a focus position/Z height of the surface point P1 on the workpiece 320. The stack image number 40 of FIG. 13B corresponds to a second single image plane SIP2 of FIG. 13A, which corresponds to the focus position/Z height of the center of the imaged lighting portion I330A. As illustrated in FIG. 13B, the contrast metric value for the imaged lighting portion peak ILPPK may in some instances be significantly greater than the contrast metric value for the workpiece surface peak WSPK1 (e.g., in the example of FIG. 13B, the imaged lighting portion peak ILPPK is illustrated as having a contrast metric value of approximately 1.5, and the workpiece surface peak WSPK1 is illustrated of having a contrast metric value of approximately 0.5). In some instances, the relatively high contrast metric value of the imaged lighting portion peak ILPPK may result at least in part from the relatively bright imaged lighting portion I330A having a high level of contrast in relation to certain surrounding areas/pixels (e.g., similar to the pixel PXB of FIG. 12 imaging at least part of the imaged lighting portion I330A and correspondingly having a relatively high level of contrast in relation to certain surrounding pixels).

In various implementations, an objective of the system is to accurately determine a focus position/Z height of the surface point P1 on the surface of the workpiece 320 (e.g., so that an accurate three dimensional position of the surface point P1 can be determined, such as part of determining an overall shape of the workpiece 320). In this regard, the inclusion of the focus curve data that corresponds to the imaged lighting portion peak ILPPK may be undesirable. More specifically, in various implementations the focus curve data that corresponds to the imaged lighting portion peak ILPPK in the focus curve FCL1 could result (e.g., unless otherwise addressed in accordance with techniques as described herein) in an inaccurate determination of the three dimensional position of the surface point P1, due to the imaged lighting portion peak ILPPK indicating that the focus peak for the corresponding pixel position may be at a location other than that of the workpiece surface peak WSPK1.

As an illustrative example, in FIG. 13A the center of the imaged lighting portion I330A is shown to approximately be at a same focus position/Z height as the surface point P2 on the workpiece 320. Thus, an accurate focus curve corresponding to the pixel position of the surface point P2 would have a workpiece surface peak approximately at stack image number 40 (e.g., corresponding to a number of the image in the corresponding image stack and a corresponding focus position/Z height, similar to that for the imaged lighting portion peak ILPPK in FIG. 13B). With respect to the focus curve FCL1, in an implementation where a highest peak in a focus curve is regarded as indicating the focus position/Z height of the corresponding surface point on the workpiece surface, the focus curve FCL1 (i.e., which corresponds to the pixel position of the surface point P1) could otherwise be interpreted as indicating that the surface point P1 is at approximately the same or a similar focus position/Z height as the surface point P2, which could result in an inaccurate determination of the shape of the workpiece 320 (e.g., rather than the curved surface as illustrated). In certain implementations, two strong/high peaks in a focus curve may generally not be able to be accurately processed by an algorithm/process that is intended to analyze and determine only a single peak in focus curve data, thus potentially resulting in either an inaccurate determination or the algorithm/process indicating that no definitive focus position can be determined for the data. As noted above, such results would generally be undesirable.

In comparison to the contrast focus curve FCL1 which corresponds to a first image stack that is acquired utilizing the first workpiece lighting which comprises light from the first lighting position 331A, a second contrast focus curve FCL2 corresponds to a second image stack which is acquired utilizing second workpiece lighting which comprises light from a second lighting position (e.g., lighting position 331B, 331H, or 331E, etc.). The second workpiece lighting does not result in an imaged lighting portion at the same X, Y pixel location of the surface point PL. In each of the examples of the contrast focus curves FCL1 and FCL2, the corresponding contrast focus curve data is thus for the pixel location corresponding to that of the surface point P1 on the workpiece 320.

As indicated by the contrast focus curve FCL2, the second workpiece lighting which is utilized for acquiring the second image stack is sufficient for producing a workpiece surface peak WSPK2 which is centered/located at focus curve data corresponding to the stack image number 20 (e.g., corresponding to a number of the image in the corresponding second image stack and a corresponding focus position/Z height). As further indicated by the contrast focus curve FCL2, the second workpiece lighting which is utilized for acquiring the second image stack does not produce an imaged lighting portion at the pixel position corresponding to the location of the surface point P1, and thus does not include an imaged lighting portion peak. Thus, in accordance with techniques as described herein, to address certain glare issues (e.g., as corresponding to the imaged lighting portion I330A) at least part of the second image stack data (e.g., corresponding to at least part of the focus curve FCL2) may be utilized/included (e.g., as part of a composite stack) for enabling an accurate determination of the focus position/Z height of the surface point P1 (e.g., as may be utilized as part of an accurate determination of a shape of the workpiece 320).

Figure 14:
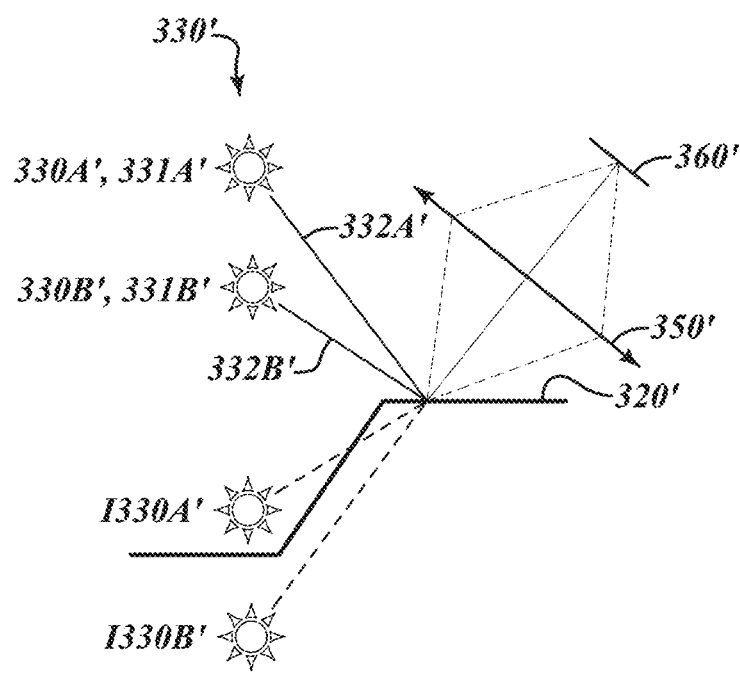
FIG. 14 is a diagram illustrating utilization of lighting portions at different lighting positions for providing different workpiece lighting for illuminating a workpiece and glare issues caused by imaged lighting portions.

FIG. 14 is a diagram illustrating a metrology system (e.g., which may have certain similarities to the metrology system of FIGS. 1-3) with representations of a portion of a surface of a workpiece 320', a lighting configuration 330' (e.g., including lighting portions 330A' and 330B') and an objective lens 350' and a camera 360' (e.g., and for which it will be appreciated that additional intervening components may be included such as illustrated in FIG. 3). The configuration of FIG. 14 is noted to have certain similarities to the configuration of FIG. 10A, but for which in FIG. 14 the imaging system (i.e., including the objective lens 350' and camera 360') is illustrated in an orientation that is tilted in relation to the workpiece 320', and for which the workpiece 320' and lighting configuration 330' have differences from the examples shown in FIG. 10A. As shown in FIG. 14, the lighting portions 330A' and 330B' at respective lighting positions 331A' and 331B' are utilized for providing workpiece lighting for illuminating the workpiece 320'. Due to reflections from the surface of the workpiece 320', imaged lighting portions I330A' and I330B' are produced (e.g., which may also be referenced in some implementations as glare, or glare spots, or ghost images I330A' and I330B').

Figure 15A:
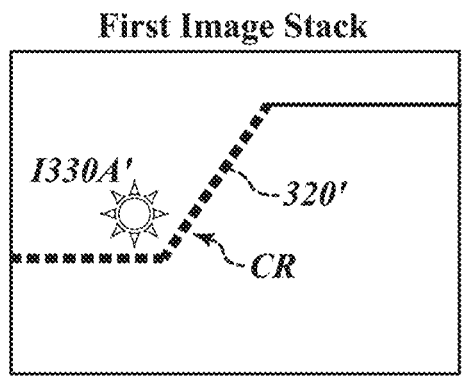
FIGS. 15A-15C are diagrams illustrating representations of image stack data resulting from the lighting portions at the different lighting positions of FIG. 14.
Figure 15B:
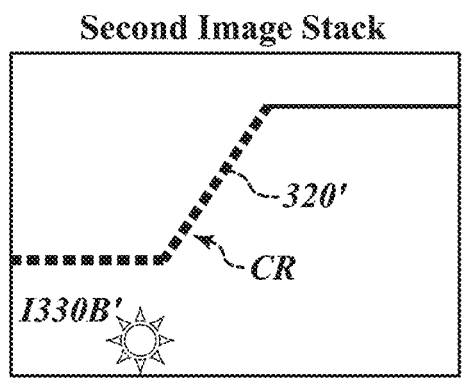
Figure 15C:
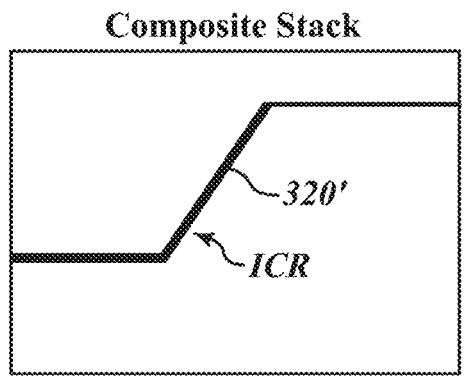

FIGS. 15A-15C are diagrams illustrating representations of image stack data resulting from the utilization of the lighting portions at the different lighting positions of FIG. 14. FIGS. 15A-15C are noted to have certain similarities to FIGS. 11A-11C as described above. For example, FIG. 15A pictorially represents first image stack data corresponding to a first image stack that is acquired utilizing workpiece lighting (e.g., which may be referenced as first workpiece lighting in this example) which comprises light 332A' from the first lighting position 331A'. Due to the imaged lighting portion I330A' (e.g., and the corresponding glare issues), part of the surface of the workpiece 320' in the image stack data is characterized as a challenging region CR. As described above in relation to FIGS. 13A and 13B, in various implementations the imaged lighting portion I330A' may result in an improper peak in corresponding focus curve data, etc.

FIG. 15B pictorially represents second image stack data corresponding to a second image stack that is acquired utilizing workpiece lighting (e.g., which may be referenced as second workpiece lighting in this example) which comprises light 332B' from the second lighting position 331B'. Due to the imaged lighting portion I330B' (e.g., and the corresponding glare issues), part of the surface of the workpiece 320' in the image stack data is characterized as a challenging region CR (e.g., which may be similar to the challenging region CR of FIG. 15A). The imaged lighting portion I330B' may result in similar issues as those described above with regard to imaged lighting portion I330A' (e.g., as may result in an improper peak in focus curve data, etc.). In relation to the orientation of the camera 360' and objective lens 350', it is noted that the locations of the imaged lighting portions I330A' and I330B' correspond to different pixel positions, and thus will be in different positions in the field of view of the first and second image stacks, and thus may correspond to different focus curves. As described in more detail below (e.g., with respect to FIG. 15C), image stack data from different image stacks may be utilized in combination (e.g., as may result in improved contrast regions, etc.).

As pictorially represented in FIG. 15C, by combining certain portions of the image stack data from the first and second image stacks of FIGS. 15A and 15B, a composite stack may be created with an improved contrast region ICR in place of the challenging region CR of FIGS. 15A and 15B.

More specifically, it is noted that the image stack data of FIG. 15B does not include the issues resulting from the imaged lighting portion I330A' (e.g., as centered at a first pixel position), and that the image stack data of FIG. 15A does not include the issues resulting from the imaged lighting portion I330B' (e.g., as centered at a second pixel position), for which portions of the data from each image stack may be utilized to form a composite stack (e.g., in accordance with techniques as described above) which does not include the issues resulting from either of the imaged lighting portions I330A' or I330B'.

Figure 16:
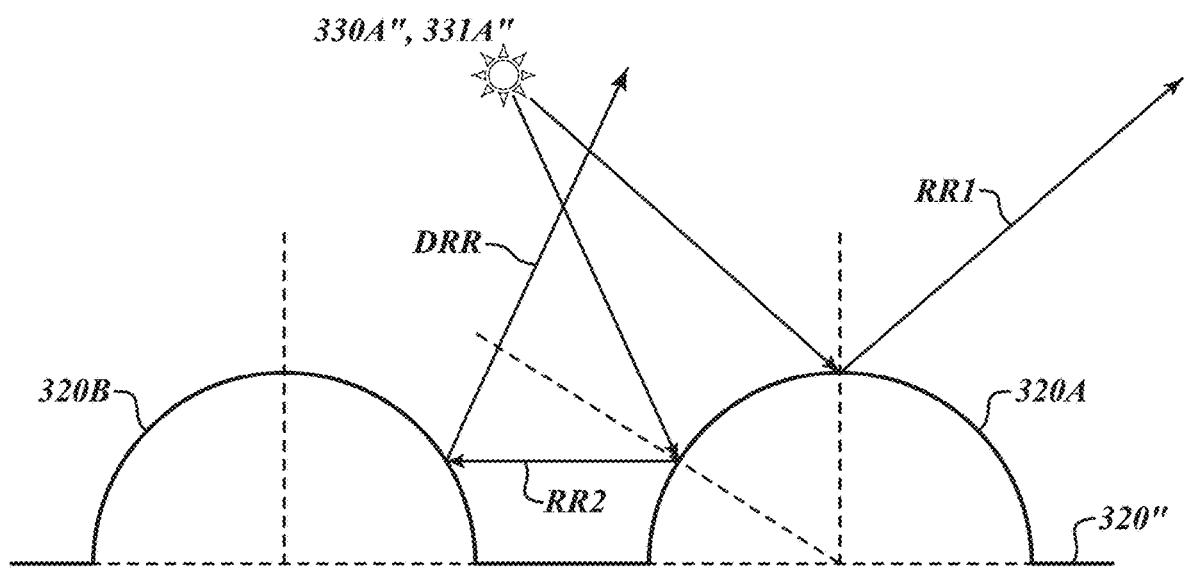
FIG. 16 is a diagram illustrating a lighting portion at a lighting position for providing workpiece lighting for illuminating a workpiece and glare issues caused by multiple imaged lighting portions resulting from multiple reflections.

FIG. 16 is a diagram illustrating a lighting portion 330A" at a lighting position 331A" for providing workpiece lighting for illuminating a workpiece 320" and glare issues (e.g., caused by multiple imaged lighting portions) resulting from multiple reflections. As illustrated in FIG. 16, in various implementations, a workpiece 320" may include multiple reflective surfaces (e.g., as part of workpiece surface portions 320A and 320B), for which multiple imaged lighting portions may result. For example, for a configuration with a lighting portion 330A" at a lighting position 331A", a first surface portion 320A of the workpiece 320 may reflect a first reflected ray RR1 (e.g., which may result in glare issues corresponding to an imaged lighting portion). The first surface portion 320A may also reflect a second reflected ray RR2 which may be further reflected by a second surface portion 320B of the workpiece 320 as a double reflected ray DRR (e.g., which may result in glare issues corresponding to a second imaged lighting portion). It will be appreciated that techniques as described herein may also be effective for addressing a scenario such as that illustrated in FIG. 16. More specifically, even in instances where multiple reflections may occur (e.g., which may result in glare issues corresponding to multiple imaged lighting portions and/or may otherwise further increase the complexity of the processing), by acquiring additional image stacks utilizing workpiece lighting which comprises light from different lighting positions, a composite stack may be determined utilizing image stack data that does not correspond to glare issues/imaged lighting portions and which results in accurate determinations of focus positions/Z heights of surface points on the workpiece.

Figure 17:
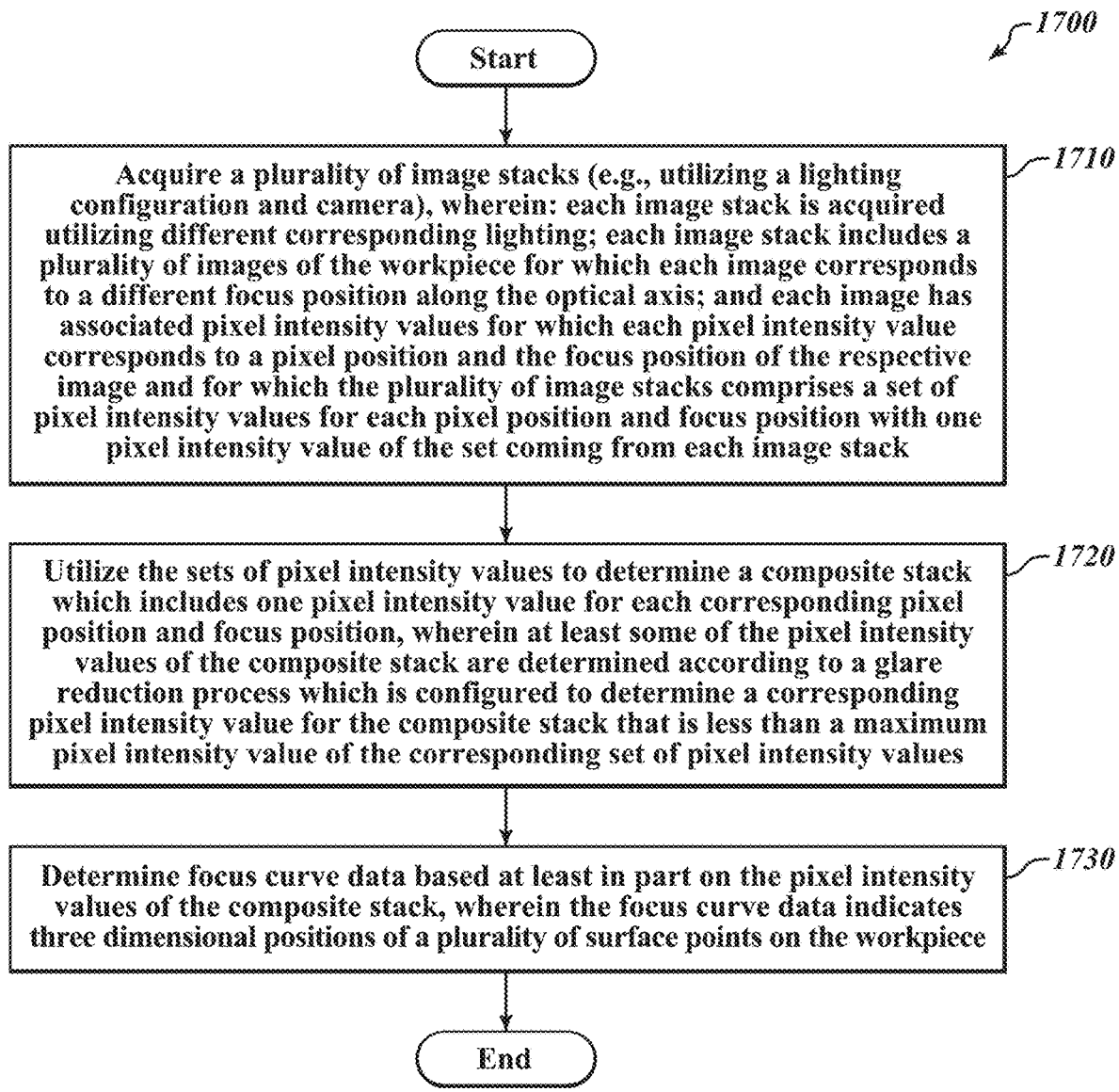
FIG. 17 is a flow diagram illustrating one exemplary implementation of a routine for operating a metrology system for determining focus curve data which indicates three dimensional positions of a plurality of surface points on a workpiece.

FIG. 17 is a flow diagram illustrating one exemplary implementation of a routine 1700 for operating a metrology system for determining focus curve data which indicates three dimensional positions of a plurality of surface points on a workpiece. At a block 1710, a plurality of image stacks are acquired (e.g., utilizing a lighting configuration and camera). Each image stack is acquired utilizing different corresponding lighting. Each image stack includes a plurality of images of the workpiece for which each image corresponds to a different focus position along the optical axis. Each image has associated pixel intensity values for which each pixel intensity value corresponds to a pixel position and the focus position of the respective image and for which the plurality of image stacks comprises a set of pixel intensity values for each pixel position and focus position with one pixel intensity value of the set coming from each image stack.

At a block 1720, the sets of pixel intensity values are utilized to determine a composite stack which includes one pixel intensity value for each corresponding pixel position and focus position. At least some of the pixel intensity values of the composite stack are determined according to a glare reduction process which is configured to determine a corresponding pixel intensity value for the composite stack that is less than a maximum pixel intensity value of the corresponding set of pixel intensity values. At a block 1730, focus curve data is determined based at least in part on the pixel intensity values of the composite stack, wherein the focus curve data indicates three dimensional positions of a plurality of surface points on the workpiece.

The following describes various exemplary embodiments of the present disclosure with various features and elements annotated with reference numerals found in FIGS. 1-17. It should be understood that the reference numerals are added to indicate exemplary embodiments, and the features and elements are not limited to the particular embodiments illustrated in FIGS. 1-17.

According to one aspect, a metrology system is provided that includes an objective lens 350, a camera 360, a lighting configuration 330, one or more processors (e.g., processor(s) 125), and a memory (e.g., memory 140). The objective lens 350 has an optical axis OA and is configured to input image light 355 arising from a workpiece 320 and to transmit the image light 355 along an imaging optical path OPATH. The camera 360 has a sensor array including pixels, wherein the camera 360 is configured to receive image light 355 transmitted along the imaging optical path OPATH and to provide images of the workpiece 320, wherein a focus position that corresponds to the focus of the images is configured to be variable along the optical axis OA. The lighting configuration 330 is configured to provide light from a plurality of different lighting positions (e.g. lighting positions 331A-331H) toward the workpiece 320. The plurality of lighting positions includes at least first and second lighting positions (e.g., lighting positions 331A and 331E).

The one or more processors (e.g., processor(s) 125) are coupled to the memory (e.g., memory 140). The memory stores program instructions that when executed by the one or more processors cause the one or more processors to at least control the lighting configuration 330 and the camera 360 to acquire a plurality of image stacks, the plurality of image stacks including at least first and second image stacks. Each image stack is acquired utilizing different corresponding workpiece lighting. The first image stack (e.g., image stack ISL1) is acquired utilizing first workpiece lighting which comprises light (e.g., light 332A) from the first lighting position (e.g., lighting position 331A), and the second image stack (e.g., image stack ISL2) is acquired utilizing second workpiece lighting which comprises light (e.g., light 332E) from the second lighting position (e.g., lighting position 331E).

Each image stack includes a plurality of images of the workpiece 320 for which each image corresponds to a different focus position along the optical axis OA (e.g., see FIGS. 7B and 8B). Each image has associated pixel intensity values for which each pixel intensity value corresponds to a pixel position and the focus position of the respective image and for which the plurality of image stacks comprises a set of pixel intensity values for each pixel position and focus position EFP with one pixel intensity value of the set coming from each image stack (e.g., see pixels PXA and PXB of FIG. 12, with corresponding example sets of pixel intensity values of: pixel PXA: 40, 20, 5, 0, 0, 0, 5, 20; and pixel PXB: 127, 0, 0, 0, 0, 0, 0, 0, as coming from 8 corresponding image stacks). The sets of pixel intensity values are utilized to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values (e.g., for pixels PXA and PXB, as one specific numerical example a median selection process and/or a calculation process may determine pixel intensity values of 5 and 0, respectively). Focus curve data is determined based at least in part on the pixel intensity values of the composite stack, wherein the focus curve data indicates three dimensional positions of a plurality of surface points on the workpiece (e.g., see FIG. 6A and the corresponding description).

In various implementations, the glare reduction process comprises utilizing an intensity determination process as applied to at least some of the pixel intensity values of the corresponding set of pixel intensity values to determine the corresponding pixel intensity values of the composite stack. In various implementations, the intensity determination process comprises at least one of: a selection process (e.g., a median selection process) which selects a value (e.g., a median value) of the set of pixel intensity values to be utilized as the corresponding pixel intensity value of the composite stack; or a calculation process (e.g., an averaging process) which utilizes two or more values of the set of pixel intensity values to determine a value to be utilized as the corresponding pixel intensity value of the composite stack (e.g., an averaging process which utilizes/selects at least two pixel intensity values of the set of pixel intensity values to be utilized for an average calculation, such as a simple average calculation or a weighted average calculation, etc.).

In various implementations, the image stacks each image the same field of view and area of the workpiece. In various implementations, for each focus position the plurality of image stacks includes a set of images with one image from each image stack corresponding to the respective focus position (e.g., see FIGS. 7B and 8B for focus positions Z(1) to Z(4)).

In various implementations, the plurality of different lighting positions further comprises at least third and fourth lighting positions (e.g., lighting positions 331C and 331G). In various implementations, the plurality of image stacks further comprises at least third and fourth image stacks acquired utilizing third workpiece lighting and fourth workpiece lighting, respectively, wherein the third workpiece lighting comprises light from the third lighting position and the fourth workpiece lighting comprises light from the fourth lighting position. In various implementations, the plurality of different lighting positions further comprises at least fifth, sixth, seventh and eighth lighting positions (e.g., lighting positions 331B, 331F, 331D and 331H). In various implementations, the plurality of image stacks comprises at least fifth, sixth, seventh and eighth image stacks acquired utilizing fifth, sixth, seventh and eighth workpiece lighting, respectively, wherein the fifth, sixth, seventh and eighth workpiece lighting comprises light from the fifth, sixth, seventh and eighth lighting positions, respectively.

In various implementations, in the first image stack, glare from reflection of the light from the first lighting position results in a first pixel intensity value which is a first maximum pixel intensity value in a first set of pixel intensity values corresponding to a first pixel position and a first focus position (e.g., a pixel intensity value of 127 for pixel PXB); and the glare reduction process determines a corresponding first pixel intensity value for the composite stack that is less than the first maximum pixel intensity value of the first set of pixel intensity values. In various implementations, the plurality of image stacks further comprises at least third and fourth image stacks acquired utilizing third workpiece lighting and fourth workpiece lighting, respectively, wherein the third workpiece lighting comprises light from the third lighting position (e.g., lighting position 331C) and the fourth workpiece lighting comprises light from the fourth lighting position (e.g., lighting position 331G); and the first set of pixel intensity values includes second, third and fourth pixel intensity values that correspond to the second, third and fourth image stacks acquired utilizing light from the second, third and fourth lighting positions, respectively, (e.g., and without utilizing light from the first lighting position), and which do not produce glare at the first pixel position and first focus position and for which the second, third and fourth pixel intensity values are less than the first pixel intensity value.

In various implementations, the glare reduction process is configured to at least one of: determine a median value of the first set of pixel intensity values as the corresponding first pixel intensity value for the composite stack; select one of the second, third or fourth pixel intensity values from the first set of pixel intensity values as the corresponding first pixel intensity value for the composite stack; or determine the corresponding first pixel intensity value for the composite stack according to an averaging process which utilizes at least two of the second, third and fourth pixel intensity values to determine an average (e.g., at least one of a simple average or a weighted average) pixel intensity value as the corresponding first pixel intensity value for the composite stack.

In various implementations, the lighting configuration 330 comprises a plurality of lighting portions (e.g., lighting portions 330A-330H) that provide the light from the plurality of different lighting positions (e.g., lighting positions 331A-331H), and an arrangement in which the lighting portions are distributed is an annular arrangement, with each lighting portion located at a different angular position within the annular arrangement (e.g., and each lighting portion corresponding to a different lighting position of the lighting configuration 330). In various implementations, the plurality of lighting portions comprises at least four lighting portions.

In another aspect, a method for operating the metrology system is provided. The method includes (e.g., see FIG. 17) acquiring a plurality of image stacks, the plurality of image stacks comprising at least first and second image stacks. Each image stack is acquired utilizing different corresponding workpiece lighting. The first image stack is acquired utilizing first workpiece lighting which comprises light (e.g., light 332A) from the first lighting position (e.g., lighting position 331A), and the second image stack is acquired utilizing second workpiece lighting which comprises light (e.g., light 332E) from the second lighting position (e.g., lighting position 331E). Each image stack includes a plurality of images of the workpiece 320 for which each image corresponds to a different focus position along the optical axis OA. Each image has associated pixel intensity values for which each pixel intensity value corresponds to a pixel position and the focus position of the respective image and for which the plurality of image stacks comprises a set of pixel intensity values for each pixel position and focus position EFP with one pixel intensity value of the set coming from each image stack. The sets of pixel intensity values are utilized to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values. Focus curve data is determined based at least in part on the pixel intensity values of the composite stack, wherein the focus curve data indicates three dimensional positions of a plurality of surface points on the workpiece. In various implementations, in the first image stack, glare from reflection of the light from the first lighting position results in a first pixel intensity value which is a first maximum pixel intensity value in a first set of pixel intensity values corresponding to a first pixel position and a first focus position; and the glare reduction process determines a corresponding first pixel intensity value for the composite stack that is less than the first maximum pixel intensity value of the first set of pixel intensity values.

In another aspect, a method for determining focus curve data which indicates three dimensional positions of a plurality of surface points on a workpiece 320 is provided. The method includes utilizing a lighting configuration 330 and a camera 360 to acquire a plurality of image stacks, the plurality of image stacks comprising at least first and second image stacks. Each image stack is acquired utilizing different corresponding workpiece lighting. The first image stack is acquired utilizing first workpiece lighting which comprises light (e.g., light 332A) from a first lighting position (e.g., lighting position 331A), and the second image stack is acquired utilizing second workpiece lighting which comprises light (e.g., light 332E) from a second lighting position (e.g., lighting position 331E). Each image stack includes a plurality of images of the workpiece 320 for which each image corresponds to a different focus position along the optical axis OA. Each image has associated pixel intensity values for which each pixel intensity value corresponds to a pixel position and the focus position of the respective image and for which the plurality of image stacks comprises a set of pixel intensity values for each pixel position and focus position EFP with one pixel intensity value of the set coming from each image stack. The sets of pixel intensity values are utilized to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values. Focus curve data is determined based at least in part on the pixel intensity values of the composite stack, wherein the focus curve data indicates three dimensional positions of a plurality of surface points on the workpiece.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:
   an objective lens comprising an optical axis and configured to input image light arising from a workpiece and to transmit the image light along an imaging optical path;
   a camera comprising a sensor array including pixels, wherein the camera is configured to receive image light transmitted along the imaging optical path and to provide images of the workpiece, wherein a focus position that corresponds to the focus of the images is configured to be variable along the optical axis;
   a lighting configuration configured to provide light from a plurality of different lighting positions toward the workpiece, the plurality of lighting positions comprising at least first and second lighting positions;
   one or more processors; and
   a memory coupled to the one or more processors and storing program instructions that when executed by the one or more processors cause the one or more processors to at least:
      control the lighting configuration and the camera to acquire a plurality of image stacks, the plurality of image stacks comprising at least first and second image stacks, wherein:
         each image stack is acquired utilizing different corresponding workpiece lighting, including:
            the first image stack is acquired utilizing first workpiece lighting which comprises light from the first lighting position; and
            the second image stack is acquired utilizing second workpiece lighting which comprises light from the second lighting position;
         each image stack includes a plurality of images of the workpiece for which each image corresponds to a different focus position along the optical axis; and
         each image has associated pixel intensity values for which each pixel intensity value corresponds to a pixel position and the focus position of the respective image and for which the plurality of image stacks comprises a set of pixel intensity values for each pixel position and focus position with one pixel intensity value of the set coming from each image stack;
      utilize the sets of pixel intensity values to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values; and
      determine focus curve data based at least in part on the pixel intensity values of the composite stack, wherein the focus curve data indicates three dimensional positions of a plurality of surface points on the workpiece.

2. The system of claim 1, wherein the glare reduction process comprises utilizing an intensity determination process as applied to at least some of the pixel intensity values of the corresponding set of pixel intensity values to determine the corresponding pixel intensity values of the composite stack.

3. The system of claim 2, wherein the intensity determination process comprises at least one of:
a selection process which selects a value of the set of pixel intensity values to be utilized as the corresponding pixel intensity value of the composite stack; or
a calculation process which utilizes two or more values of the set of pixel intensity values to determine a value to be utilized as the corresponding pixel intensity value of the composite stack.

4. The system of claim 1, wherein the image stacks each image the same field of view and area of the workpiece.

5. The system of claim 1, wherein for each focus position the plurality of image stacks includes a set of images with one image from each image stack corresponding to the respective focus position.

6. The system of claim 1, wherein the plurality of different lighting positions further comprises at least third and fourth lighting positions.

7. The system of claim 6, wherein the plurality of image stacks further comprises at least third and fourth image stacks acquired utilizing third workpiece lighting and fourth workpiece lighting, respectively, wherein the third workpiece lighting comprises light from the third lighting position and the fourth workpiece lighting comprises light from the fourth lighting position.

8. The system of claim 7, wherein the plurality of different lighting positions further comprises at least fifth, sixth, seventh and eighth lighting positions.

9. The system of claim 8, wherein the plurality of image stacks comprises at least fifth, sixth, seventh and eighth image stacks acquired utilizing fifth, sixth, seventh and eighth workpiece lighting, respectively, wherein the fifth, sixth, seventh and eighth workpiece lighting comprises light from the fifth, sixth, seventh and eighth lighting positions, respectively.

10. The system of claim 1, wherein:
in the first image stack, glare from reflection of the light from the first lighting position results in a first pixel intensity value which is a first maximum pixel intensity value in a first set of pixel intensity values corresponding to a first pixel position and a first focus position; and
the glare reduction process determines a corresponding first pixel intensity value for the composite stack that is less than the first maximum pixel intensity value of the first set of pixel intensity values.

11. The system of claim 10, wherein:
the plurality of image stacks further comprises at least third and fourth image stacks acquired utilizing third workpiece lighting and fourth workpiece lighting, respectively, wherein the third workpiece lighting comprises light from the third lighting position and the fourth workpiece lighting comprises light from the fourth lighting position; and
the first set of pixel intensity values includes second, third and fourth pixel intensity values that correspond to the second, third and fourth image stacks acquired utilizing light from the second, third and fourth lighting positions, respectively, and which do not produce glare at the first pixel position and first focus position and for which the second, third and fourth pixel intensity values are less than the first pixel intensity value.

12. The system of claim 11, wherein:
the glare reduction process is configured to at least one of:
determine a median value of the first set of pixel intensity values as the corresponding first pixel intensity value for the composite stack;
select one of the second, third or fourth pixel intensity values from the first set of pixel intensity values as the corresponding first pixel intensity value for the composite stack; or
determine the corresponding first pixel intensity value for the composite stack according to an averaging process which utilizes at least two of the second, third and fourth pixel intensity values to determine an average pixel intensity value as the corresponding first pixel intensity value for the composite stack.

13. The system of claim 1, wherein the lighting configuration comprises a plurality of lighting portions that provide the light from the plurality of different lighting positions, and an arrangement in which the lighting portions are distributed is an annular arrangement, with each lighting portion located at a different angular position within the annular arrangement.

14. The system of claim 13, wherein the plurality of lighting portions comprises at least four lighting portions.

15. A method for operating a metrology system,
the metrology system comprising:
an objective lens comprising an optical axis and configured to input image light arising from a workpiece and to transmit the image light along an imaging optical path;
a camera comprising a sensor array including pixels, wherein the camera is configured to receive image light transmitted along the imaging optical path and to provide images of the workpiece, wherein a focus position that corresponds to the focus of the images is configured to be variable along the optical axis; and
a lighting configuration configured to provide light from a plurality of different lighting positions toward the workpiece, the plurality of lighting positions comprising at least first and second lighting positions;
the method comprising:
acquiring a plurality of image stacks, the plurality of image stacks comprising at least first and second image stacks, wherein:
each image stack is acquired utilizing different corresponding workpiece lighting, including:
the first image stack is acquired utilizing first workpiece lighting which comprises light from the first lighting position; and
the second image stack is acquired utilizing second workpiece lighting which comprises light from the second lighting position;
each image stack includes a plurality of images of the workpiece for which each image corresponds to a different focus position along the optical axis; and
each image has associated pixel intensity values for which each pixel intensity value corresponds to a pixel position and the focus position of the respective image and for which the plurality of image stacks comprises a set of pixel intensity values for each pixel position and focus position with one pixel intensity value of the set coming from each image stack;
utilizing the sets of pixel intensity values to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values; and determining focus curve data based at least in part on the pixel intensity values of the composite stack, wherein the focus curve data indicates three dimensional positions of a plurality of surface points on the workpiece.

16. The method of claim 15, wherein the glare reduction process comprises utilizing an intensity determination process as applied to at least some of the pixel intensity values of the corresponding set of pixel intensity values to determine the corresponding pixel intensity values of the composite stack.

17. The method of claim 16, wherein the intensity determination process comprises at least one of:
 a selection process which selects a value of the set of pixel intensity values to be utilized as the corresponding pixel intensity value of the composite stack; or
 a calculation process which utilizes two or more values of the set of pixel intensity values to determine a value to be utilized as the corresponding pixel intensity value of the composite stack.

18. The method of claim 15, wherein the plurality of image stacks further comprises at least third and fourth image stacks acquired utilizing third workpiece lighting and fourth workpiece lighting, respectively, wherein the third workpiece lighting comprises light from a third lighting position and the fourth workpiece lighting comprises light from a fourth lighting position.

19. The method of claim 15, wherein:
 in the first image stack, glare from reflection of the light from the first lighting position results in a first pixel intensity value which is a first maximum pixel intensity value in a first set of pixel intensity values corresponding to a first pixel position and a first focus position; and
 the glare reduction process determines a corresponding first pixel intensity value for the composite stack that is less than the first maximum pixel intensity value of the first set of pixel intensity values.

20. A method for determining focus curve data which indicates three dimensional positions of a plurality of surface points on a workpiece, the method comprising:
 utilizing a lighting configuration and a camera to acquire a plurality of image stacks, the plurality of image stacks comprising at least first and second image stacks, wherein:
  each image stack is acquired utilizing different corresponding workpiece lighting, including:
   the first image stack is acquired utilizing first workpiece lighting which comprises light from a first lighting position; and
   the second image stack is acquired utilizing second workpiece lighting which comprises light from a second lighting position;
  each image stack includes a plurality of images of the workpiece for which each image corresponds to a different focus position along the optical axis; and
  each image has associated pixel intensity values for which each pixel intensity value corresponds to a pixel position and the focus position of the respective image and for which the plurality of image stacks comprises a set of pixel intensity values for each pixel position and focus position with one pixel intensity value of the set coming from each image stack;
 utilizing the sets of pixel intensity values to determine a composite stack which includes one pixel intensity value for each corresponding pixel position and focus position, wherein at least some of the pixel intensity values of the composite stack are determined according to a glare reduction process which is configured to determine a corresponding pixel intensity value for the composite stack that is less than a maximum pixel intensity value of the corresponding set of pixel intensity values; and
 determining focus curve data based at least in part on the pixel intensity values of the composite stack, wherein the focus curve data indicates three dimensional positions of a plurality of surface points on the workpiece.

* * * * *